(12) United States Patent
Weiner et al.

(10) Patent No.: US 10,944,643 B2
(45) Date of Patent: Mar. 9, 2021

(54) CLOUD INFRASTRUCTURE VOTING

(71) Applicant: Hitachi Vantara LLC, Santa Clara, CA (US)

(72) Inventors: William Weiner, Fort Collins, CO (US); Mark A. Chance, Boulder, CO (US)

(73) Assignee: HITACHI VANTARA LLC, Santa Clara, CA (US)

( * ) Notice: Subject to any disclaimer, the term of this patent is extended or adjusted under 35 U.S.C. 154(b) by 132 days.

(21) Appl. No.: 15/870,734

(22) Filed: Jan. 12, 2018

(65) Prior Publication Data

US 2018/0205618 A1 Jul. 19, 2018

Related U.S. Application Data

(60) Provisional application No. 62/445,622, filed on Jan. 12, 2017.

(51) Int. Cl.

| | |
|---|---|
| *H04L 12/24* | (2006.01) |
| *G06F 16/951* | (2019.01) |
| *H04L 29/06* | (2006.01) |
| *H04L 29/08* | (2006.01) |

(52) U.S. Cl.
CPC ............ *H04L 41/50* (2013.01); *G06F 16/951* (2019.01); *H04L 41/5012* (2013.01); *H04L 63/108* (2013.01); *H04L 63/083* (2013.01); *H04L 67/10* (2013.01)

(58) Field of Classification Search
CPC ... H04L 41/50; H04L 41/5012; H04L 63/108; H04L 63/083; H04L 67/10; G06F 16/951

USPC .......................................................... 709/225
See application file for complete search history.

(56) References Cited

U.S. PATENT DOCUMENTS

| | | |
|---|---|---|
| 8,719,818 B2 | 5/2014 | Chen et al. |
| 9,047,410 B2 | 6/2015 | Markande et al. |
| 9,245,117 B2 | 1/2016 | Weaver et al. |
| 10,095,496 B2 | 10/2018 | Winterfeldt et al. |

(Continued)

FOREIGN PATENT DOCUMENTS

| | | | | |
|---|---|---|---|---|
| WO | WO-2018019364 A1 * | 2/2018 | ........... | H04L 47/828 |
| WO | 2019089443 A1 | 5/2019 | | |
| WO | 2019089446 A1 | 5/2019 | | |

OTHER PUBLICATIONS

PCT International Search Report in International Application No. PCT/US2018/57970, dated Jan. 15, 2019.

(Continued)

*Primary Examiner* — Joseph L Greene
(74) *Attorney, Agent, or Firm* — Mattingly & Malur, PC

(57) ABSTRACT

A method and apparatus for cloud infrastructure voting to optimize usage of the cloud infrastructure are provided. The method determines the need to access a database or cloud services within a cloud infrastructure, determining a time of that need to access the database or cloud services within the cloud infrastructure. Access to the database or cloud services within the cloud infrastructure is determined based on the time of the need to access the database or cloud services using predetermined access rules. The apparatus provides a voter and user information database that contains the predetermined access rules for accessing the cloud infrastructure.

17 Claims, 16 Drawing Sheets

(56) References Cited

U.S. PATENT DOCUMENTS

| | | |
|---|---|---|
| 2012/0084262 A1* | 4/2012 | Dwarampudi .......... G06F 9/442 |
| | | 707/667 |
| 2013/0019242 A1 | 1/2013 | Chen et al. |
| 2013/0035114 A1* | 2/2013 | Holden ................. H04W 4/025 |
| | | 455/456.3 |
| 2013/0263209 A1* | 10/2013 | Panuganty .............. H04L 43/04 |
| | | 726/1 |
| 2014/0026122 A1 | 1/2014 | Markande et al. |
| 2014/0157050 A1 | 6/2014 | Zhao |
| 2015/0227890 A1* | 8/2015 | Bednarek ......... G06Q 10/08355 |
| | | 705/26.81 |
| 2015/0269064 A1 | 9/2015 | Bishop et al. |
| 2015/0278517 A1 | 10/2015 | Weaver et al. |
| 2017/0126787 A1 | 5/2017 | Martinez et al. |
| 2017/0228227 A1 | 8/2017 | Winterfeldt et al. |

OTHER PUBLICATIONS

PCT International Search Report in International Application No. PCT/US2018/57976, dated Jan. 15, 2019.

\* cited by examiner

Inventory of Code Functions

| | |
|---|---|
| ROVL-{client}-{database}-ClusterStatus | Function to query database status |
| ROVL-{client}-{database}-VerifyUser | Function to verify user email address |
| ROVL-{client}-{database}-ChangePassword | Function for user to change password |
| ROVL-{client}-{database}-DelayedActionOneShot | Function to handle a delayed action and remove the calling event |
| ROVL-{client}-{database}-CreateUser | Function to create a new user |
| ROVL-{client}-{database}-Vote | Function to set a user's vote |
| ROVL-{client}-{database}-ClusterUp | Function to start a database from the snapshot |
| ROVL-{client}-ToSlack | Function to send message to Slack channel |
| ROVL-{client}-{database}-LostPassword | Function to issues a lost password email with reset password link |
| ROVL-{client}-{database}-ScheduleAction | Function to set a one-time delayed event |
| ROVL-{client}-{database}-SnapshotManager | Function to create database snapshots and prune unneeded snapshots |
| ROVL-{client}-FromSlack | Function to handle messages from Slack channel |
| ROVL-{client}-{database}-ClusterDown | Function to stop a database with a final snapshot |
| ROVL-{client}-RunRemoteDataPipeline | Function to activate a client's AWS Data Pipeline flow |
| ROVL-{client}-{database}-Manage | Function to interpret commands from the web interface |
| ROVL-{client}-{database}-ResetPassword | Function to reset users password |
| ROVL-{client}-{database}-VoteStatus | Function to query votes from user vote and information database |
| ROVL-{client}-{database}-TallyVotes | Function to tally the votes and perform the needed actions |
| ROVL-{client}-{database}-AlertClusterUp | Function to alert that the database has been left up (usually run in the late evenings |
| ROVL-{client}-{database}-MetricsManager | Function to gather database internal metrics an export to client metric monitoring system |

FIG. 12

CLOUD INFRASTRUCTURE VOTING

RELATED APPLICATIONS

This application claims priority to and the benefit of U.S. provisional patent application No. 62/445,622, filed Jan. 12, 2017, which is incorporated herein by reference in its entirety.

FIELD

The presently disclosed embodiments relates generally to the field of cloud computing. More particularly, presently disclosed embodiments relate to cloud infrastructure management systems that determine the run state of a managed cloud infrastructure through negotiation for availability of the managed cloud infrastructure.

BACKGROUND

Cloud computing is an internet technology (IT) paradigm that enables ubiquitous access to shared pools of configurable system resources and higher-level services that can be rapidly provisioned and require minimal management effort. This management may be performed over the internet. Cloud computing relies on resource sharing to achieve coherence and economies of scale, similar to utility services.

Third party cloud services, such as Amazon Web Services (AWS) allow organizations to focus on their core business instead of spending resources on building up a computer infrastructure, thus minimizing infrastructure costs. In addition, cloud computing allows IT resources to be rapidly directed as needed to meet business demands. Cloud providers such as AWS may use a "pay as you go" model, which can lead to unexpected operating expenses if IT administrators are not well-versed in managing cloud computing services.

Services such as AWS provide high-capacity networks, low-cost computers, and storage devices. In addition, hardware may also be provided. These services offer virtualization, service-oriented architecture, autonomic, and utility computing. Virtualization is one way that cloud computing may help reduce costs. Virtualization software separates a physical computing device into one or more "virtual" devices, each of which may be easily used and managed to perform specific tasks. Operating system-level virtualization creates a scalable system of multiple independent computing devices, allowing idle computing resources to be allocated more efficiently. Cost reduction results from increased infrastructure utilization. Autonomic computing automates the process that allows a user to perform on-demand provisioning. By minimizing user involvement, processing may be faster, errors may be reduced, and costs may be decreased.

Such autonomic processing also has a downside. These automated or autonomic processes may best be run on an "as needed" basis and the timing of their actions on the cloud infrastructure may affect humans interacting with the cloud infrastructure. Voting systems may be used to determine the run state of a cloud infrastructure so that human actors interacting with the cloud may negotiate the availability of the cloud infrastructure. This may ensure that the cloud infrastructure is available when needed by human actors and is not shut down during use. One downside of such processes is that the systems programmed to start and stop cloud infrastructure may not be cost resolution aware. Such systems may charge a user for a full hour of use for any use during an hour. Two uses of the same infrastructure component during an hour, even if non-overlapping in time will result in two hourly charges being made, in contrast to one piece of the same infrastructure not shutdown between uses. This results in operations that may overspend and no single user or actor using the infrastructure is responsible for cost optimization or containment. Another downside is that such systems may delete the infrastructure when one actor has finished but other actors are still actively using the infrastructure. Actors can include humans, scheduled actions, and automated processes that operate on an "as needed" basis and as such each actor is unaware of the intentions of the others.

There is a need in the art for a voting system capable of controlling the starting and stopping of cloud infrastructure, which is aware of billing policies and can assist in preventing cost overruns on cloud infrastructure.

SUMMARY

Embodiments described herein provide a method for controlling access to a cloud infrastructure. The method comprises determining a need to access a database or cloud services within a cloud infrastructure and determining a time of the need to access the database or cloud services within the cloud infrastructure and then allowing access to the database or cloud services within the cloud infrastructure if the time of the need to access the database or cloud services complies with predetermined access rules.

An additional embodiment provides an apparatus for controlling access to a cloud infrastructure. The apparatus comprises a voter and information database in communication with a cloud infrastructure, wherein the cloud infrastructure contains predetermined access rules for the cloud infrastructure.

An additional embodiment provides an apparatus for controlling access to a cloud infrastructure. The apparatus provides means for determining a need to access a database within a cloud infrastructure; means for determining a time of the need to access the database within the cloud infrastructure; and means for allowing access to the database within the cloud infrastructure if the time of the need to access the database complies with predetermined access rules.

A yet further embodiment provides a non-transitory computer-readable medium, containing instructions, which when executed cause a processor to perform the following steps determining a need to access a database within a cloud infrastructure; determine a time of the need to access the database within the cloud infrastructure; and allow access to the database within the cloud infrastructure if the time of the need to access the database complies with predetermined access rules.

BRIEF DESCRIPTION OF THE DRAWINGS

Other systems, methods, features, and advantages of the presently disclosed embodiments will be or will become apparent to one with skill in the art upon examination of the following figures and detailed description. It is intended that all such additional systems, methods, features, and advantages be included within this description, be within the scope of the presently disclosed embodiments, and be protected by the accompanying claims. Component parts shown in the drawings are not necessarily to scale and may be exaggerated to better illustrate the important features of the presently disclosed embodiments. In the drawings, like reference numerals designate like parts throughout the different views, wherein:

FIG. 12 provides an inventory of code functions for an uptime architecture, in accordance with embodiments of the application.

DETAILED DESCRIPTION

The detailed description of exemplary embodiments herein makes reference to the accompanying drawings and pictures, which show the exemplary embodiments by way of illustration and its best mode. While these exemplary embodiments are described in sufficient detail to enable those skilled in the art to practice the presently disclosed embodiments, it should be understood that other embodiments may be realized and that logical and mechanical changes may be made without departing from the spirit and scope of the presently disclosed embodiments. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment. Furthermore, new combinations of these components and actions may be executed in any combination and are not limited to the paths shown in accordance with the spirit and scope of the presently disclosed embodiments.

Embodiments disclosed herein describe a method and apparatus for cloud infrastructure voting. The architecture described herein provides a cost-aware management method for the "uptime" of a cloud infrastructure, such as Amazon Redshift data warehouse, or other similar service. Automated actors, such as software, may create cloud infrastructure availability in a functionally correct way that requires that each automated actor have a unique "vote". To accomplish this, automated actors may change their vote and poll the availability of the requested cloud infrastructure. Secure operations may be provided through the use of unique enablement and authentication of automated actors.

Figure 1:
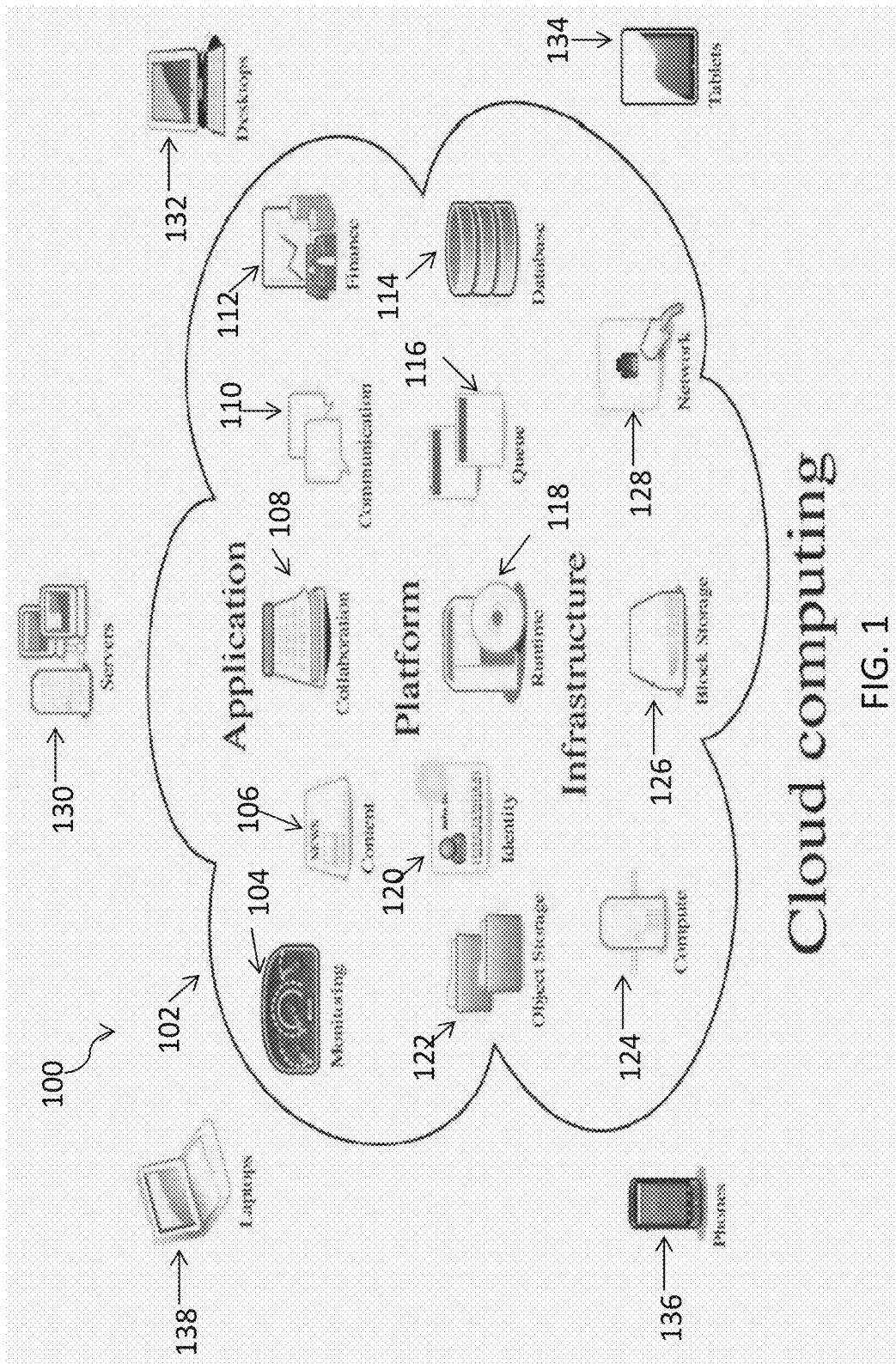
FIG. 1 shows a block diagram of a cloud computing infrastructure, in accordance with an embodiment of the application.

FIG. 1 depicts a cloud computing architecture 100. The architecture 100 includes the cloud 102 and devices that may access cloud 102. Cloud 102 may include monitoring devices or applications 104, content 106, collaboration tools 108, communication tools 110, financial tools 112, databases such as database 114. Queues 116 may also assist in cloud infrastructure operations. Runtime software 118 may also be incorporated into cloud 102. For security purposes, identity applications or tools 120 may be located within cloud 102. Object storage 122 may also be provided. Computing resources 124 are common cloud infrastructure components along with block storage 126, and network connectivity 128.

Cloud 102 may be accessed by a variety of devices, also depicted in FIG. 1. Multiple servers 130 may also serve as access points or gateways to the cloud 102. Most computer users are familiar with access to the cloud 102 through one of a desktop computer, tablet device 134, mobile or smart phone 136, or a laptop 138. The cloud computing infrastructure 100 allows each of the devices access to the cloud computing resources found in cloud 102 simultaneously in an "on-demand" manner.

Cloud infrastructures provide a service-oriented architecture (SOA) that allows users to divide problems into services that may be integrated to provide a solution. One of the benefits of using the cloud infrastructure is that all of the resources of the cloud 102 may be provided as services in a standardized manner. In addition, cloud computing leverages concepts from utility computing to provide metrics for the services used. These metrics are the core of the public pay-per-use models, such as Amazon Web Services (AWS). Measured services are a key component of the feedback loop in autonomic computing, allowing on-demand scaling of services as well as automatic failure recovery.

Pricing on a utility computing basis is fine-grained, with usage based billing options. Provisioning of resources may be on-demand, and users do not need to engineer a system for peak loads. Scalability, in both directions, up and down, provides the needed amount of resources precisely when needed.

Figure 2:
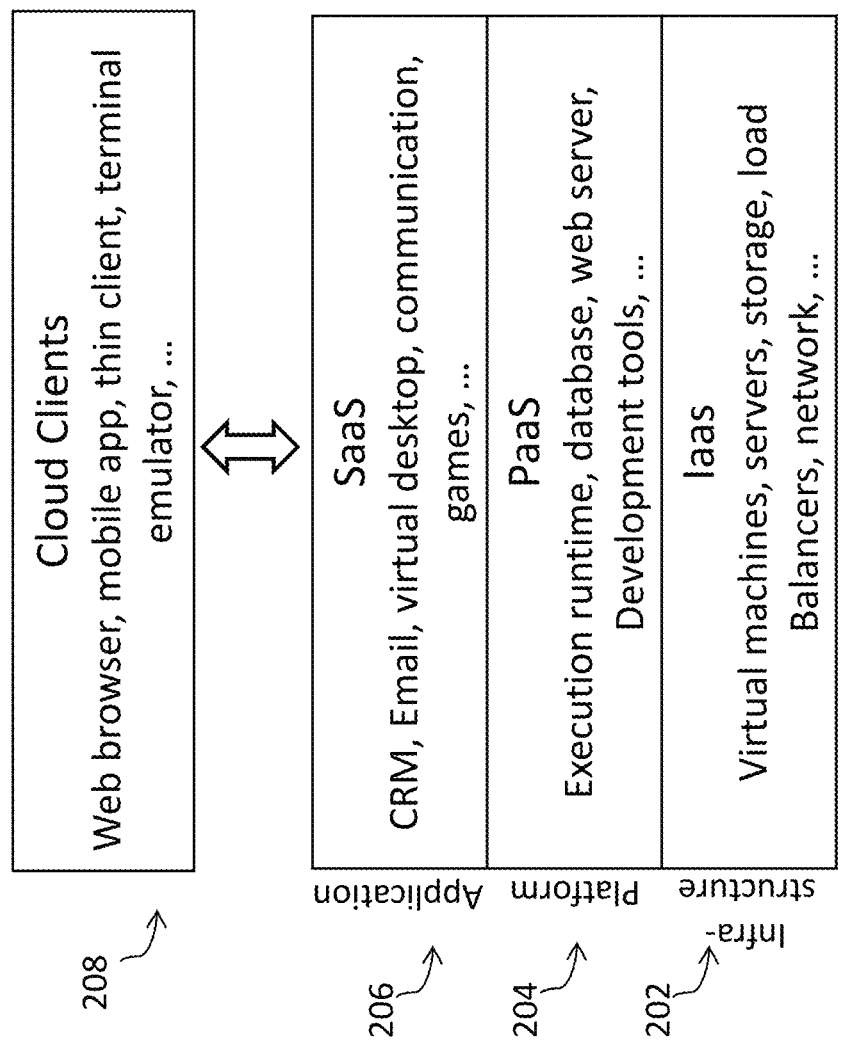
FIG. 2 shows a layer structure of a cloud computing architecture in accordance with an embodiment of the application.

FIG. 2 provides an example of the levels of service that may be provided by a cloud infrastructure, such as that shown in FIG. 1. Infrastructure 202 may be provided as a service, known as infrastructure as a service (IaaS). This layer may provide virtual machines, storage, load balancers, and network services. On top of IaaS layer 202 is found the platform as a service (PaaS) layer 204. The PaaS layer 204 may provide execution runtime, databases, web servers, and development tools. On top of the PaaS layer 204 is the software as a service (SaaS) layer 206. SaaS layer 206 may provide customer relationship management (CRM) services, email, virtual desktops, communication, games, and other services. Cloud clients 208 may interact with one or more of the above layers, depending on services needed. Those services may include web browsers, mobile applications, thin client use, and terminal emulators, to name a few.

IaaS layer 202 provides online services offering high-level application programming interfaces (API) that may be used to dereference varying low-level details of the underlying network infrastructure, such a physical computing resources, location, data partitioning, scaling, security, backup, and others. A hypervisor runs the virtual machines as guests. Pools of hypervisors within the cloud operational system may support large numbers of virtual machines and allow scaling of services up or down, accruing to customers' varying requirements. IaaS layers 202 may also offer additional resources such as a virtual machine disk-image library, raw block storage, file or object storage, firewalls, load balancers, internet protocol (IP) addresses, virtual local area networks (VLAN), and software bundles.

PaaS layer 204 provides the capability to deploy onto the cloud infrastructure consumer-created or acquired applications created using programming languages, libraries, services, and tools that may be supported by the provider. The user or consumer does not manage or control the underlying cloud infrastructure 200. The cloud infrastructure 200 may include the network, servers, operating systems, or storage. However, the users or consumers have control over the deployed applications and may control configuration settings for the application hosting environment. The PaaS layer may provide a development environment for application developers. PaaS layer 204 may provide a computing platform, typically including an operating system, programming-language environment, database, and a web server.

SaaS layer 206 allows a user to run a provider's applications running on a cloud infrastructure. The applications may be available from various client devices through either a thin-client interface such as a web browser, or a program interface. Users gain access to application software and databases. Cloud providers manage the infrastructure and platforms that run the applications. SaaS layer 206 may be run on a pay-per-use basis, or on a subscription basis. Cloud users do not typically manage the infrastructure and platforms that run the applications. This eliminates the need to install and run the application on a user's computers, simplifying maintenance and support. Cloud applications differ from other applications in scalability, which may be achieved by cloning tasks onto multiple virtual machines at run-time to meet changing work demands. Load balancers may distribute the work over the virtual machines. This load balancing may be transparent to the user, who sees only a single access point. To accommodate a large number of cloud users, cloud applications may be multitenant, allowing one machine to serve more than one cloud-user organization.

Cloud infrastructure providers may provide web interfaces for starting and stopping their equipment and may also provide APIs to perform the same actions that may be more accessible to computer software. Humans may be assigned to ensure that the funds spent on cloud infrastructure usage are optimized by ensuring that unneeded equipment is turned off when not in use. This process may be performed through person to person communication and may be done in conjunction with scheduled standard hours of operation.

Cloud infrastructure tools are available for the creation and destruction of cloud infrastructures. Services such as AWS offer tools that make changes according the predefined definitions. In AWS a tool for performing such actions is known as AWS CloudFormation. These tools may help simplify starting and stopping cloud infrastructure but do not provide management advice as to when such actions should be performed. Embodiments described herein may also effect such changes and may modify existing cloud infrastructure.

Figure 3:
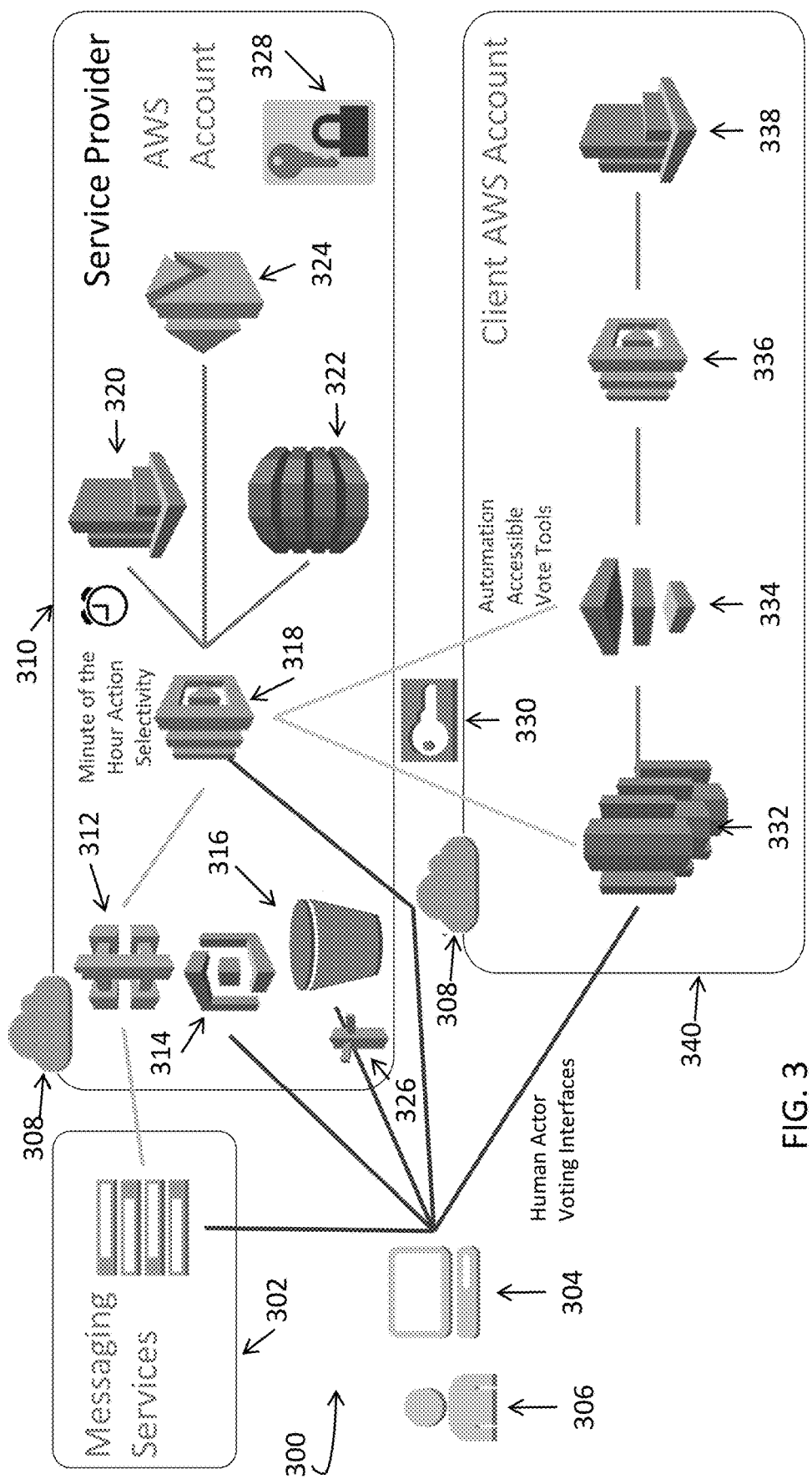
FIG. 3 is a system-level block diagram of an uptime architecture, in accordance with an embodiment of the application.

FIG. 3 shows a block diagram of a Redshift Overlord (ROVL) uptime architecture. AWS currently operates a data warehouse service known as Redshift. AWS offers other databases and services with similar controls and cost/use profiles. Other cloud service providers may offer similar functionality and the uptime architecture described herein may be used with any cloud service provider data warehouse service. The uptime architecture 300 includes messaging service 302—some examples of which are Slack, Skype and Hipchat. The messaging service 302 may allow "bots" to send and receive messages from a channel. If "bots" are used, they may be called through keywords that are predefined. Messaging service 302 interacts with the human actor voting interface 304, which may use a computer to manage the cloud infrastructure usage. Human actor 306 may also be designated as a user or manager. Human actor 306 uses voting interface 304 to interact with the cloud infrastructure, which may be provided by AWS 308. A user may interact with a service provider AWS account 310 or may interact with a client AWS account 340. Human actors 306 may enter the cloud infrastructure through an API authentication module 312. The API authentication module 312 is a fully managed service that allows application developers to create, publish, maintain, monitor, and secure APIs at any scale. The API authentication module may act as a "front door" for applications to access data, business logic, or functionality. In addition, API authentication module 312 provides the application-specific access to the developer-centric portion of the cloud infrastructure. A user may also be required to authenticate as part of an access scheme. This authentication may be provided by authentication services 314. A user may also interface with a static web page 316 and a domain name service (DNS) 326. These services may be provided by the cloud service provider and each may be a separate service. Users typically select only the services needed for their usage needs for cloud services. Each of the API gateway 312, authentication service 314, and static web page 316 may operate with or through a code execution service 318. Static web page 316 may be provided by a storage service such as Amazon S3 storage, or other equivalent service offering object storage. Code execution service 318 may offer human actors the option to set minute of the hour action selectivity to ensure more cost-effective cloud usage, which will be discussed in more detail below. In addition, code execution service 318 may provide for user sign-up and user sign-in services that allow access control for web and mobile applications. Also interacting with the code execution service 318 are the event scheduling service 320, vote and user information database 322, and email service 324. Event scheduling service 320 is a monitoring service for AWS cloud resources as well as applications running on AWS. Event scheduling service 320 may collect and track metrics, collect and monitor log files, set alarms, and react automatically to changes in AWS resources. Vote and user information database 322 is a NoSQL database. Key management service 328 allows for the creation and control of the encryption keys used to encrypt data and also provide security modules for key security. The key management service 328 may also interact with other functional services on an as-needed basis. Because ROVL commands are simple and powerful, they may be easily and quickly sent from smart phones and other mobile devices. This expands the locations in which database work can be performed. Also, other human action input systems may be employed with ROVL. Natural language systems like Amazon Echo or Apple Siri or Google Assistant may be used to provide the command input to ROVL. This expands the ease in which complex data processing actions may be scheduled or initiated.

The AWS Client Account 340 may include warehouse databases under management 332, as well as automated data-action tools 334, and may also allow access to other cloud services. Both the warehouse databases under management 332 and the automated data-action tools 334 may be in contact with the code execution service of the service provider AWS account 310 and may do so through the use of keys 330. Databases may be filled by automated data tools, such as AWS Data Pipeline, or similar services. These automated data tools permit custom code to be run as part of the flow, and the uptime architecture voting calls may be inserted into these flows. Automated data-action tools 334 may automate the movement and transformation of data and may also be in contact with the triggering of automated data actions module 336. In turn, the triggering of automated data actions module 336 may be in communication with a module for monitoring changes the require data actions 338.

In an embodiment the database under management 332 and the automated data action tools 334 participate in a voting process that checks database availability and ensures that the database is fully restored before use. ROVL uptime architecture may initiate a data flow to process data into database under management 332. Monitoring module 338 may include a variety of tools to create and manage events within a client AWS account 340. The triggering module for automated data actions 336 may take events from the monitoring module for changes that require data action 338 and convert those events into invocations of data action flows. In some embodiments, monitoring module 338 may initiate action to allow starting of other tools besides a data pipeline.

In an embodiment a suite of tools is provided and contains a tool to manage the "uptime" or connected time of cloud infrastructure, such as Amazon Redshift data warehouse, or other similar service. User voting, or selectively determining when to connect and disconnect from the service may be enabled at the level of an individual user and an individual database. Automated actors, such as software, may create cloud infrastructure availability on a functionally correct way that requires each automated user to have a unique "vote." Votes are stored in a small NoSQL database table, such as vote and user information database 322. This table holds the user name, email address, desired vote, user password hash and salt, and information about what data-action services the user may activate. A vote is the user's desired state of the database under management 332. Any number of independent votes may be defined, such as one per user or automation component. These votes are allowed to change the state of the database under management 332.

If any actor desires the database under management 332 to be made available through their vote, database under management 332 will be started or left running.

Automated actors may be permitted to change their vote and poll the availability of the requested cloud infrastructure. Unique enablement and individual authentication service 314 of automated actors may be provided to ensure secure operations. Each automated actor may be assigned a user name in the vote and user information database 322. Service provider account components may be authenticated using AWS or cloud infrastructure security components. If the automation exists outside the AWS account the components may be authenticated using a unique username and password through the authentication authorization 314.

In operation, an embodiment allows automated actors to "vote" for or against database availability and this may provide a number of advantages. First, the presence of new data may trigger data process tools 334 to integrate this new data into warehouse databases under management 332 even when such databases would normally be turned off. For example, new US economic data being published to Internet sites may cause warehouse databases under management 332 to be turned on in order to incorporate the new economic data. Second, operational metrics from other parts of an information technology (IT) infrastructure may trigger data actions to be performed. As one example, if the size of newly available data has reached a threshold or trigger point, a database, such as the warehouse databases under management 332, may be forced to take a specific action. The metrics may be provided by a client's metric system, or other independent system, such as CloudWatch. For example, if a specified threshold number of new users has been reached, a data flow process may be started to analyze the latest batch of users and compare the new user's characteristics with a prior batch of user characteristics. Third, if the load on the database systems, such as the warehouse databases under management 332 becomes too high as determined by automated monitoring triggers, then additional parallel instances or copies of the database may be started. Metrics may be used to determine if the database under management is overloaded, such as if a predetermined load factor is reached. Once this occurs, a process may be initiated that characterizes the new users and compares them with previous users. This data flow may be used to start the database under management 332 to perform needed actions to maintain optimized use of the cloud services. The ROVL voting infrastructure provides the management to start and stop the database as needed. Starting a second database if needed is facilitated as ROVL uptime architecture uses snapshots to start a second database. Tools may be used to split the query load between databases under management 332 in such situations. Fourth, if downstream data systems detect a need for a data refresh, based on specific predetermined criteria, then a normally turned off database may be started to provide the data refresh. For example, if a machine learning or predictive analytics system reports a high level of prediction error, the predictive analytics system may retrain the model using data from a shutdown data warehouse, such as the warehouse databases under management 332.

Automated actors may drive additional sub-hourly starts and stops of the cloud infrastructure 300, possibly resulting in less than optimum operation, and additional cost. In a further embodiment, the voting functionality may be used to optimize costs by delaying the start of access to the database under management 332 until after a new hour. For example, instead of accessing the database under management 332 at 4:56 and running through 5:30, and incurring charges for the 4 pm hour and the 5 pm hour, the voting mechanism delays the access until 5 pm, incurring only one hour of cost. A further embodiment provides for only stopping the infrastructure in the later part of an hour, to keep the cloud infrastructure accessible during the early part of an hour in case a new request arrives. Embodiments described herein provide that the exact values of the start and stop mechanism may be configurable.

The ROVL uptime architecture provides a configuration file for each database under management 332. Part of this configuration file is the time window before the top of the hour in which the database under management 332 is not to be started, to avoid incurring additional charges for only part of an hour. The configuration file also contains the window after the top of the hour in which a database under management 332 is not to be stopped. The vote tallying mechanism discussed in more detail below follows these directives and defers action until the blackout times have passed. In this way, databases under management 332 will not be started one minute before the hour, avoiding additional hourly charges. Databases under management 332 that have their last up or access vote removed just after the top of the hour will not be stopped immediately, as this hour has been paid for and leaving the database up does not incur additional charges. If an up vote occurs while in this blackout period, the database under management 332 is already up and a second database need not be started within the same hour.

In an additional embodiment, a ROVL system serves as a "serverless" SaaS implementation of a cloud hardware control system. Such as system may be based on AWS NoSQLdatabase (Amazon DynamoDb) and Amazon's code execution service (Amazon Lambda), to give just a few examples. The embodiments described herein are not limited to operating only with Amazon services, and may be used in the same manner with other cloud infrastructure services. In a further embodiment, ROVL may be implemented in a separate AWS account from the cloud infrastructure being controlled. This is shown in FIG. 3, where the database under management 332 is the cloud infrastructure being controlled for service provider account 328.

The ROVL uptime architecture provides an automation-enabled path for voting tools, as well as an information path leading from the client automation process in service provider account 328 to the Code Execution Service 318 within the ROVL uptime architecture. In an embodiment, the ROVL vote tool allows automated actors to authenticate and update the vote assigned to any automation process. The ROVL wait tool provides for pausing an automated process while ROVL makes the desired database resource available.

Cost optimization is provided because the ROVL code is time aware and also knows then specific databases will be stopped and started within an hour, based on database configurations. This configuration may be in the form of a j son file that holds the ROVL configuration for each database under management 332. The time before the top of the hour not allowing starting of a database under management 332 and the time after the top of the hour not allowing stopping of a database under management 332 are stored in the j son configuration file. This j son configuration file may be deployed to the code execution service 318 along with the code to be executed. These configurations and code behaviors may expressed in a variety of ways: first, in minutes before the top of the hour when databases will not be started, and second, minutes after the top of the hour when databases will not be shutdown. As one example, the configuration options MIN_START_MINUTE and MAX_START_MINUTE control when in an hour a database may be started. The configuration options MIN_STOP_MINUTE and MAX_STOP_MINUTE control when the database may be stopped within an hour.

The uptime management functionality of the ROVL uptime architecture may be focused on cost reduction in usage of cloud infrastructure data warehouses. Embodiments described herein add value as additional incremental savings accrue each time the ROVL uptime architecture is used. The cost savings may be significant, as using some commercially provided databases can cost over $100,000 per month to operate, based on the size of database needed and the hours of operation. Such costs may be greatly reduced when the architecture described in the embodiments is used. Additionally, given the server-less implementations of this solution the information technology (IT) cost to achieve these savings is trivial.

A further embodiment addresses the hours of use by enabling efficient starting and stopping of databases without conflicts between human and automated users. The complexity of starting and stopping databases in addition to the complexity of managing the ongoing and changing needs and desires of many users results in many cloud infrastructure database users operating their clusters continuously. As a result of these complex interactive factors, many consumers of cloud infrastructures minimize the size of their non-production databases. A non-production database may be used for a test environment. These non-production databases often do not require continuous operation, and as a result, may incur significant costs if left running. To minimize such costs users may turn them off when not needed. However, while the size of the non-production database may be minimized to keep costs down, the complexity of operating on a part-time schedule still results in additional costs being incurred. The high costs of continuous operation of test databases forces skimping on the size of test databases, resulting in large differences with production databases. This size differential may cause undue bugs and performance risks. Embodiments described herein provide a method and apparatus to operate larger test databases on a part time basis, while still keeping costs down.

At the same time, production databases are subject to continuous operation. In many cases, users overload these databases with multiple different use cases in an effort to reduce cost. This may result in more data being stored, with a resulting increase in cost. To give one example, multiple use cases may be combined on one database, with the requirement for the database added cumulatively. Some use cases may only require recent data to be continuously available, while other use cases may only require data be available for a few hours each week. Combining the requirements of these two widely varying use cases results in a very large database operating continuously, with significant additional cost.

Figure 13:
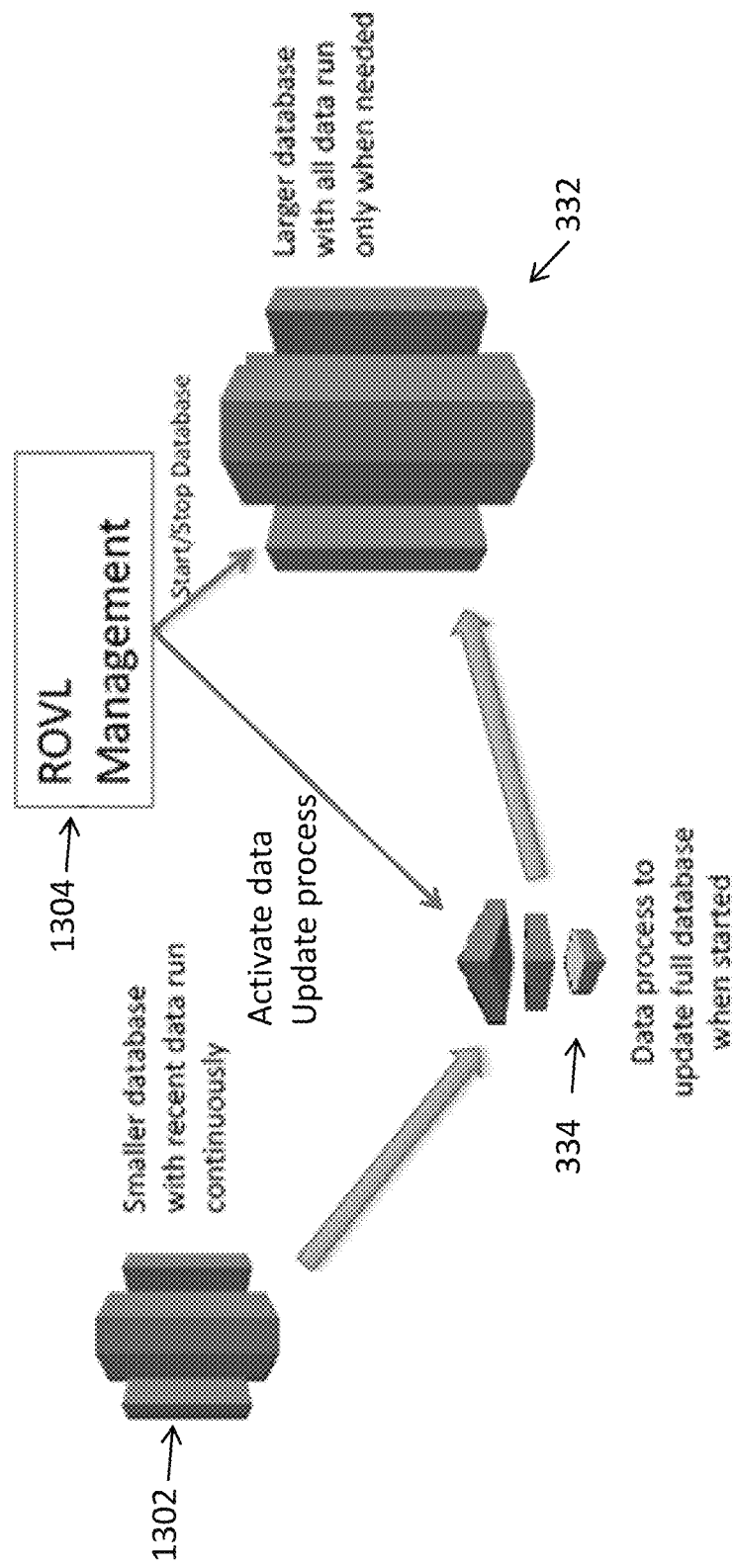
FIG. 13 is a block diagram depicting a process for cost optimizing a large database using a part-time database operational model and a full-time database operational model, in accordance with embodiments of the application.

In an additional embodiment, the databases may be run on a part-time schedule and the different use cases split into specific databases, based on the need for access to the data. For example and as shown in FIG. 13, the smaller database may run continuously, while the larger database may run for only a few hours per week. In an additional embodiment, automated processes may be used to synchronize data between these two databases, thus effectively managing the availability of the part-time database.

Figure 4:
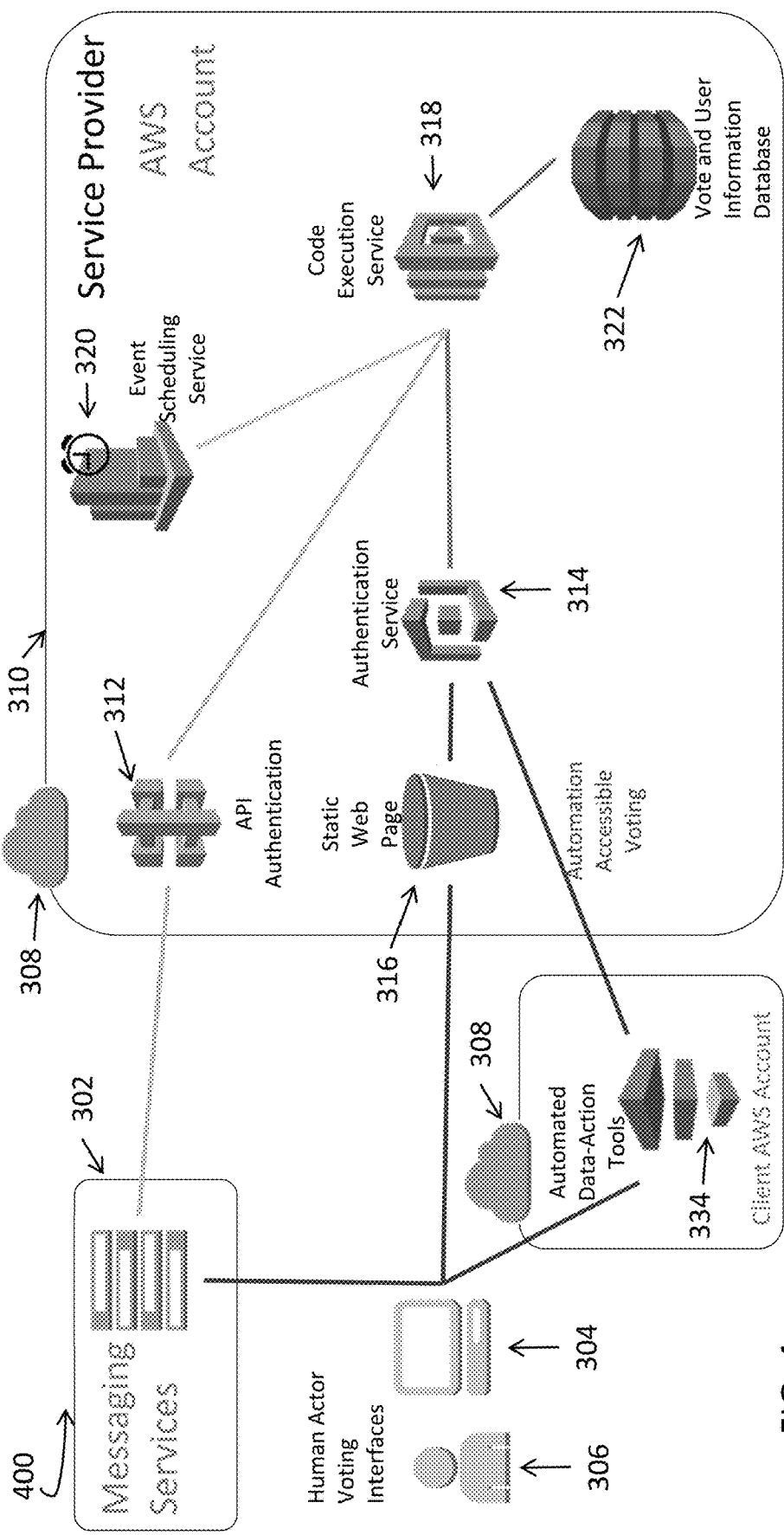
FIG. 4 shows the architecture components involved in the voting process of a cloud computing infrastructure, in accordance with an embodiment of the application.

FIG. 4 is a block diagram of the voting system 400 used in conjunction with the ROVL uptime architecture described above. The voting system 400 tallies votes that determine the state of the databases under management 332. Any up vote for a database under management 332 to be active will cause the ROVL uptime architecture to make the desired database under management 332 available. If all votes are down, then the ROVL uptime architecture turns off the database under management 332 to reduce cost.

All votes cast in the system need to be authenticated and this may be performed in two ways. First, password authentication based on the defined users and passwords known to ROVL uptime architecture and stored in the vote and user information database 322 may be used. Second, authentication service 314 that is established with external messaging systems may also be used. Many different actors may change votes with the ROVL uptime architecture through multiple paths, however, all are authenticated through one of the two processes described above. A human actor 306 may interface with a messaging service 302 and register their vote using voting interface 304. The messaging services 302 may be services such as Slack, or similar services. Human actor 306 may register their vote using the authentication required by API access. Because it is often desirable for databases to be available on predefined schedules, ROVL uptime architecture provides scheduling services to enable votes to change based on schedules. In addition, automation running within a client AWS account 310 may require a database under management 332 to be available to perform required processes. These processes may authenticate into the ROVL uptime architecture to change votes to make databases available and then release them when the action is complete and may use the automated tools 334 to perform the desired actions.

Figure 5:
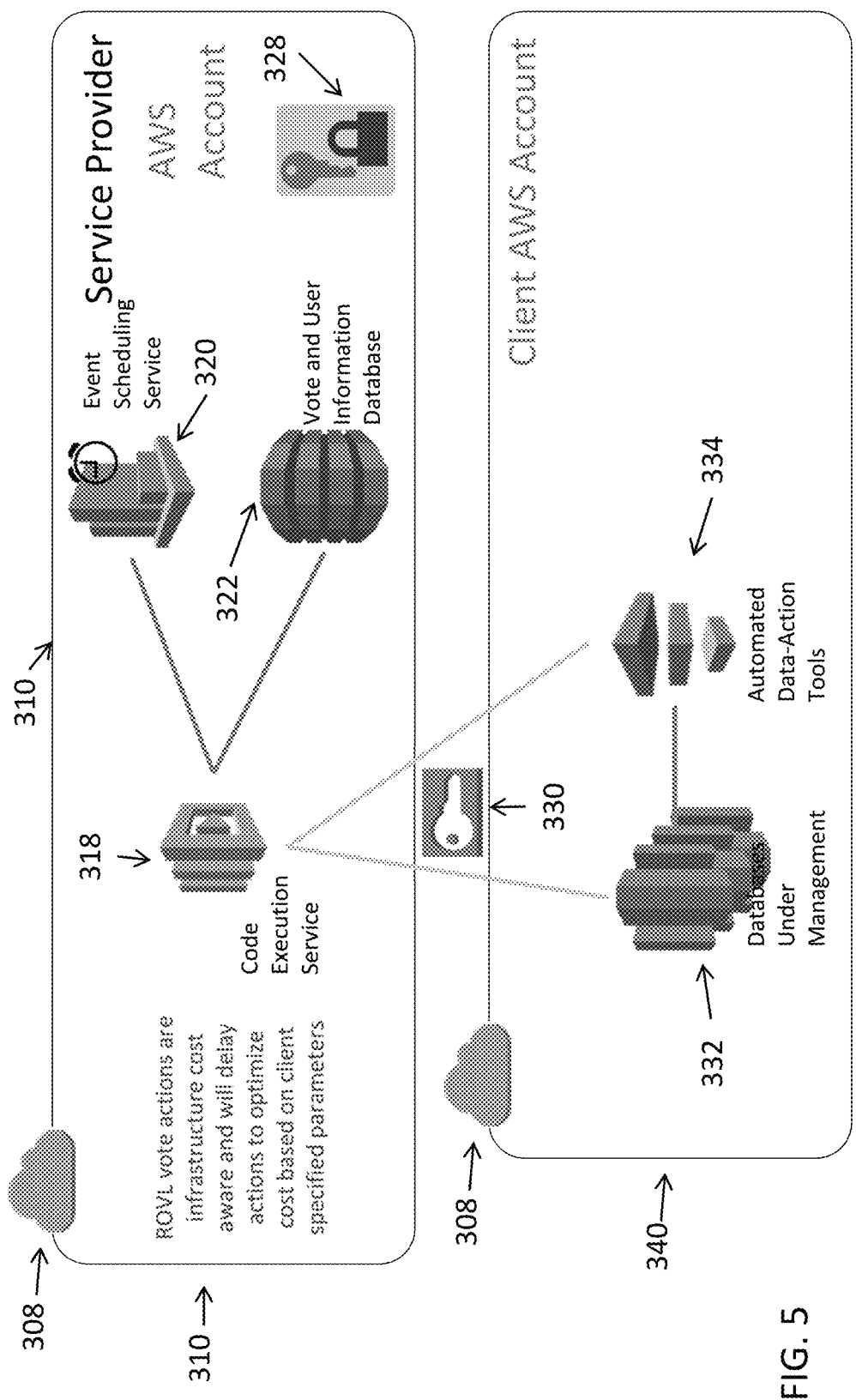
FIG. 5 is a block diagram of the architecture components involved in the action execution processes operating in conjunction with an uptime architecture, in accordance with an embodiment of the application.

FIG. 5 is a block diagram of the elements used in action systems used in conjunction with the ROVL uptime architecture. Once votes have been registered in the voter and user information database 322 a repeating scheduled event occurs (by default every minute) and executes server-less code running within event scheduling service 320. This server-less code tallies the votes, interrogates the databases under management 332 state, monitors the time of day, and determines what action should be performed. If a change in database state is determined to be necessary, the ROVL uptime architecture, through code execution service 318 issues API calls to change the state of the database under management 332. If the database is off and needs to be started, a restore-from-snapshot API call is issued from the ROVL AWS service provider account 310 to the client AWS account 340. If the database is on and needs to be stopped, a delete-database-with-snapshot API command is issued. By always stopping with a final snapshot and then starting from that same snapshot when restarting, no database information is lost.

It may be desirable for the ROVL uptime architecture to initiate a data-processing action within the client's AWS account 340. ROVL uptime architecture accepts user commands or scheduled events that activate processes that perform data actions. These processes occur within client AWS account 340. These client-side processes may also send votes to the ROVL uptime architecture to activate and deactivate databases.

Figure 6:
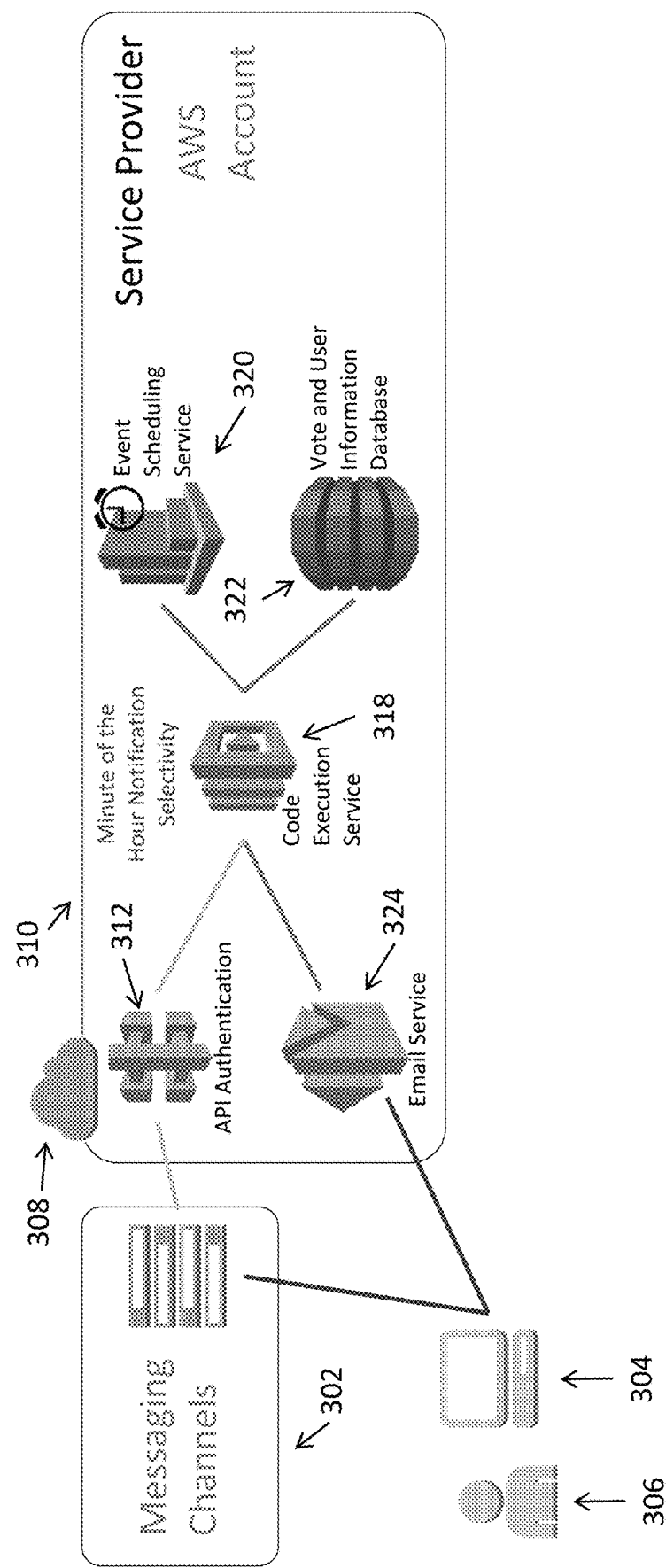
FIG. 6 is a block diagram of the architecture components involved in the notification systems operating in conjunction with an uptime architecture, in accordance with an embodiment of the application.

FIG. 6 is a block diagram of the notification systems used within the ROVL uptime architecture. In the course of managing client databases there may be a need to notify users of actions being taken or to alert users to unusual events. These situations may take many forms. If it is expected that the databases under management 332 will be off during nighttime hours, a scheduled event to activate code to query votes using the vote and information database 322 may be used to alert users through a messaging service through either authentication service 312 or email service 324 that databases are not off as would normally be expected. If a future scheduled action is being executed after being delayed, an affected user may receive a message that the delayed action by the ROVL uptime architecture has begun. Notifications may be produced as needed to alert users and such notifications may be added to the coded execution service 318.

Figure 7:
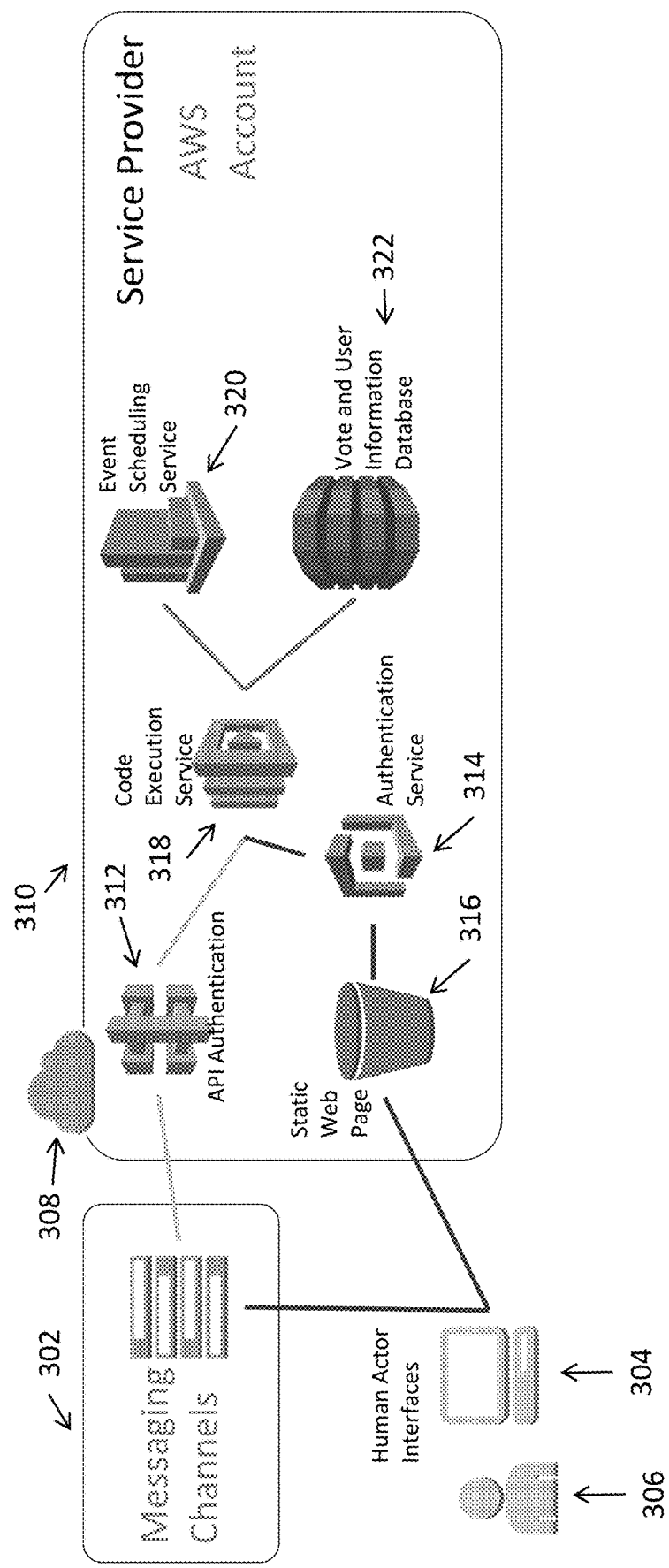
FIG. 7 is a block diagram of the architecture components involved in the delayed actions that may be taken in conjunction with an uptime architecture, in accordance with embodiments of the application.

FIG. 7 is a block diagram of delayed actions that may be taken with the ROVL uptime architecture. At times it may be preferable that some actions occur in the future. Such actions may include a user that would like a database to be started early in the morning, or another user that prefers that an automated data action take place in the evening after other processes have finished. When a user desires that an action be performed at a later time, the user may send a scheduled command through the messaging channels 302 or through a web interface to service provider AWS account 310. Once the command is authenticated, an event is given to the event scheduling service 320 along with a desired time for the event to occur. Once the command is authenticated an event is given to the event scheduling service 320 and when the scheduled time for the event arrives, the event is sent to the code execution service 318 and the desired action is performed. Once this action is performed the scheduled event is removed from the scheduling service to ensure that the event will not be re-executed in the future as the AWS scheduling service does not have the capability of scheduling a single occurrence event and also to provide better visibility to "still to be executed" events. The function of "DelayedActionOneShot" as shown in FIG. 12 is to enable single occurrence events on an event scheduling system that does not support them.

Figure 8:
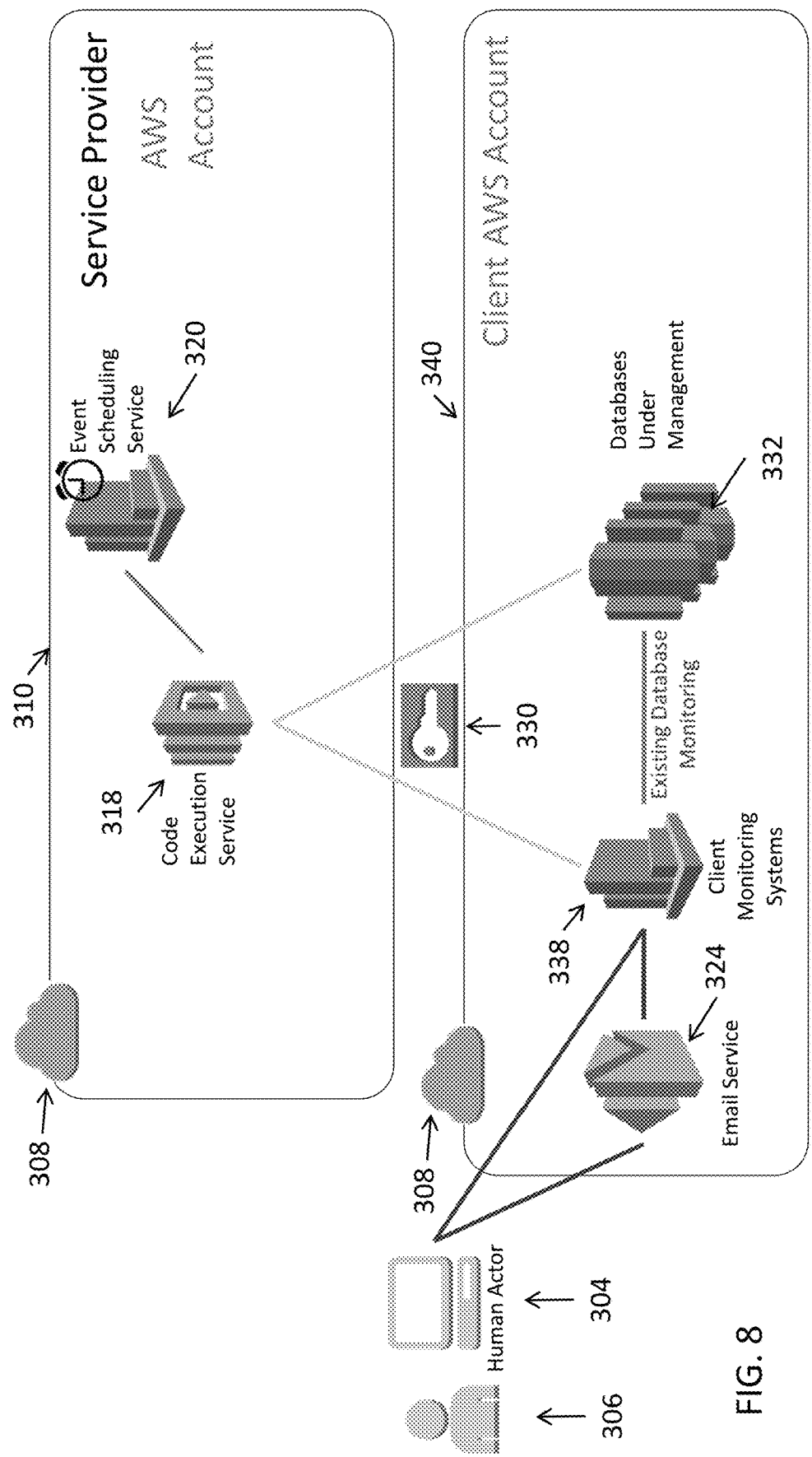
FIG. 8 is a block diagram of the architecture components involved in the advanced database monitoring services that may be operate in conjunction with an uptime architecture, in accordance with embodiments of the application.

FIG. 8 is a block diagram of monitoring services that may be performed within the ROVL uptime architecture. ROVL may add value to client databases through advanced monitoring capabilities. These advanced monitoring capabilities include: querying system tables and other internal information not generally available through standard monitoring systems. On a preferred and predetermined schedule queries are issued to the event monitoring service 320 and request that specific information be gathered. This information may be internal database information that is generally not available to the cloud provider's monitoring solution. This internal information is then delivered to the client's monitoring system 338, where users may view the information through dashboards. Alerts may also be issued using email service 324.

Figure 9:
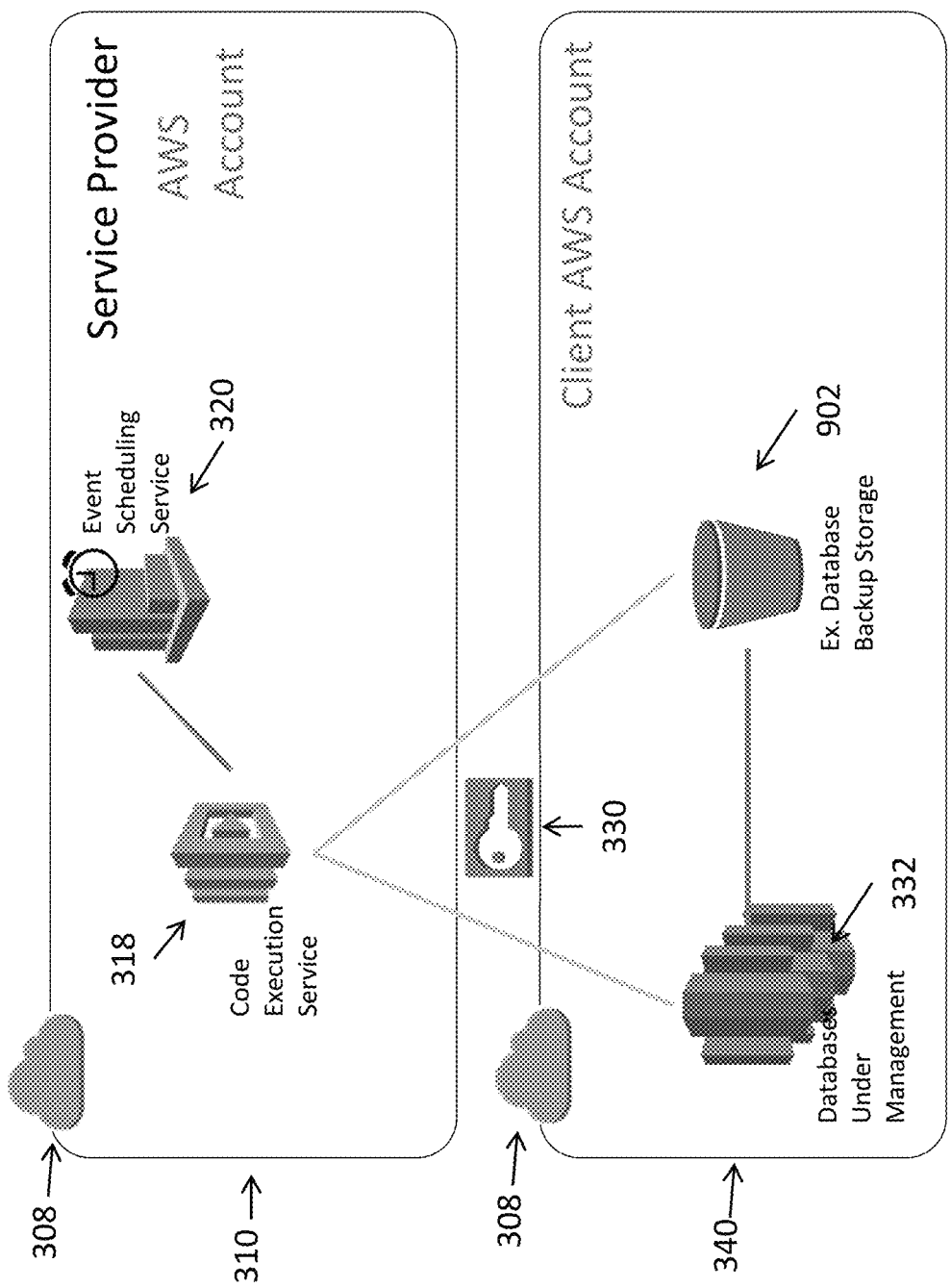
FIG. 9 is a block diagram of the architecture components involved in the automated database maintenance services that may operate in conjunction with an uptime architecture, in accordance with embodiments of the application.

FIG. 9 is a block diagram of maintenance actions that may be performed by the ROVL uptime architecture. These value-added services may be performed on a predetermined schedule. A foundational maintenance process takes and manages database backups for the databases under management 332. With the code for performing these maintenance actions within the ROVL uptime architecture, sophisticated maintenance actions may be performed with no risk of loss of key information. To give one example, a database backup service has an established schedule that activates the backup code stored within the code execution service 318. The ROVL uptime architecture then issues an API call to the database under management 332 within the client AWS account 340 to create a snapshot of the database information. It also queries the storage of previously taken database snapshots and removes unneeded snapshots to reduce cost. Advanced patterns for keeping snapshots may be achieved by storing all recent snapshots and selectively keeping a few of the older snapshots in accordance with the client specified pattern file. This allows for recovery points at recent time points while still providing historical snapshots while reducing undue storage costs.

Figure 10:
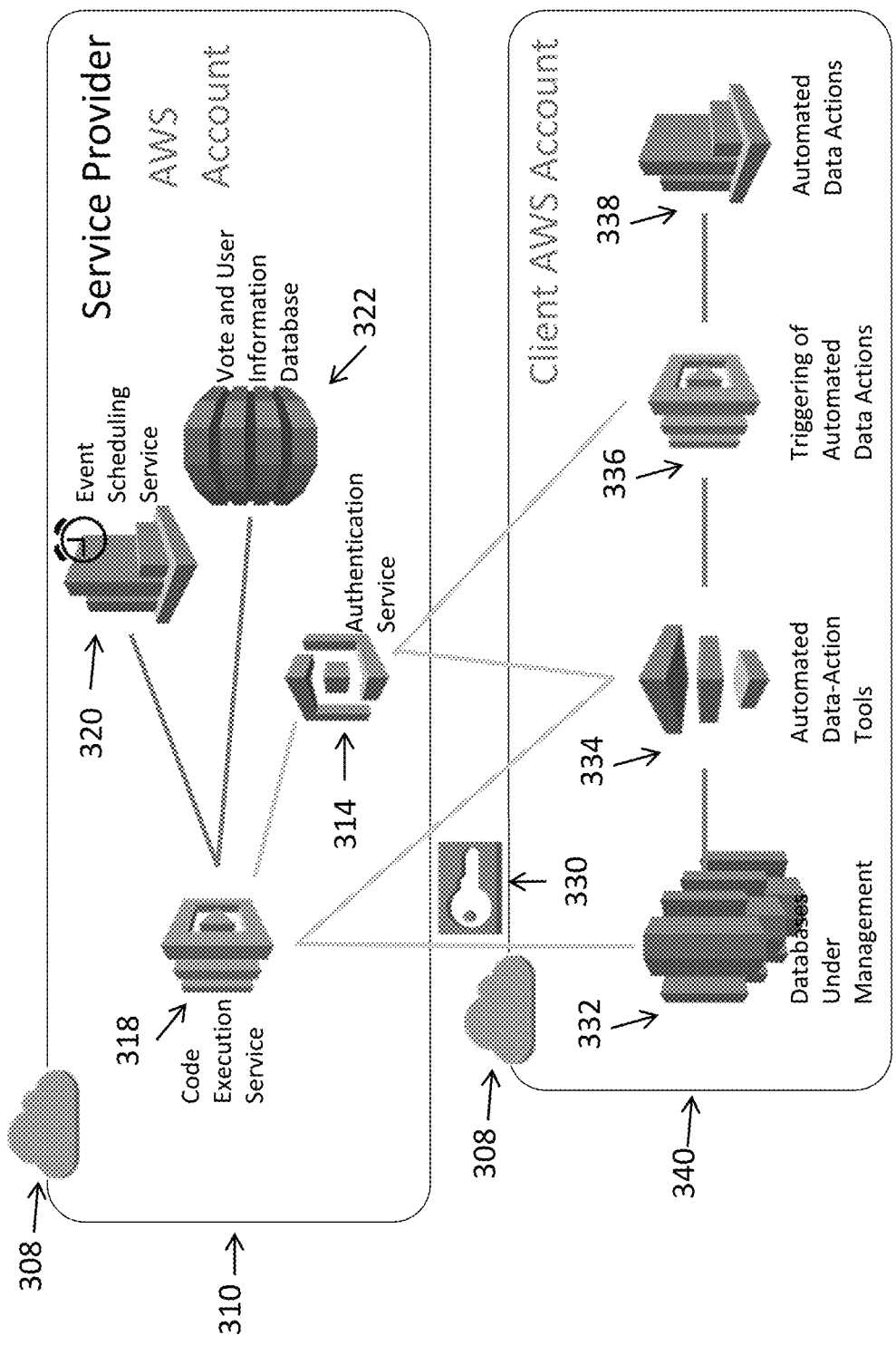
FIG. 10 is a block diagram of integration options that may be used in conjunction with an uptime architecture, in accordance with embodiments of the application.

FIG. 10 is a block diagram of ROVL integration systems, offered in conjunction with ROVL uptime architecture. Many users of cloud infrastructure are sophisticated clients with complex data processing system. In cloud infrastructure systems these data processing systems are often created by joining many systems using the mechanisms of API calls. In a similar fashion the ROVL uptime architecture may be integrated into these complex client systems so that databases need not run continuously while still being integrated within an automated system. To give just one example, a client system may create a request within that client system. A ROVL uptime architecture request may then be issued by an automated data-action system, operating on client AWS account 340. A ROVL request may then be issued from a client's automated data-action systems or from an independent application. The ROVL uptime architecture may then activate a variety of data-action flows, thus providing for ROVL uptime architecture integration into complex client systems. Automation in the client's account may invoke any ROVL action, which in turn will activate client data action systems, and they will in turn change the state of the client's database through ROVL.

Figure 11:
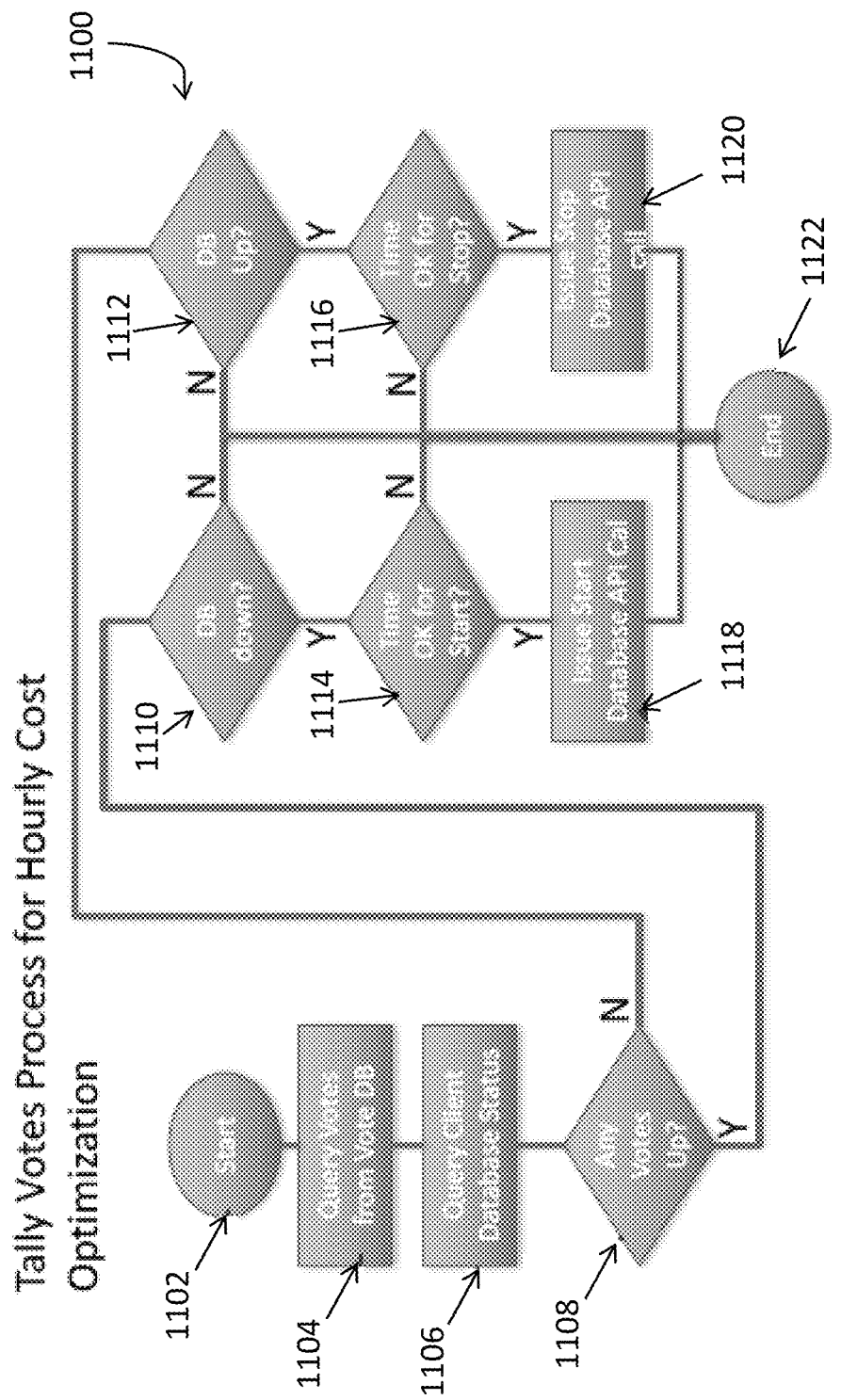
FIG. 11 is a flow chart of a method of tallying votes in an uptime architecture, in accordance with embodiments of the application.

FIG. 11 is a flow diagram of a vote tallying process that may provide hourly cost optimization. The process 1100 begins at start step 1102. In step 1104 votes are queried from a voter database. In step 1106 client database status is queried. An interim vote tally is made in decision block 1108, where the query is "Are any votes up?" If the answer is "No", then in step 1112 the query "Is the database up" posed. If the answer in decision block 1108 is "Yes", then the data flow proceeds to step 1110 where the query "Is the database down?" posed. If the answer in decision block 1108 is "Yes", then the flow moves to decision block 1110. In decision block 1110 the question is "Is the database down?" If the answer is "No" then the flow moves to decision block 1112. If the answer in decision block 1110 is "Yes", then the flow moves to decision block 1114. In decision block 1112 the query "Is the database up" posed. If the answer is "No", then the flow moves the decision block 1116. If the answer in decision block 1110 is "Yes", and the database is down, then the flow moves to decision block 1114. In decision block 1114 the query is "Is the time OK for database start?" If the answer is "No", then the flow moves to decision block 1116. If the answer is "Yes" in decision block 1114, the flow moves to step 11118 where a start database API call is issued. If the time is not OK for the database to start in decision block 1114, then the flow moves to decision block 1116, where the query is "Is the time OK for the database to stop?" If the answer to decision block 1116 is "Yes", then the flow moves to step 1120 where a database API call is issued to stop the database. If the answer is "No" in decision block 1116, then the flow returns to decision block 1114. After a start database API call is made or a stop database API call is made, the process ends at 1122.

FIG. 12 provides an inventory of code functions that may be executed by the ROVL uptime architecture system in conjunction with the operations described herein.

FIG. 13 is a system block diagram that depicts how a part-time versus a full-time database operational model may be implemented in cooperation with the ROVL uptime architecture. The smaller database with recent data 1302 may run continuously. During operation smaller database 1302 may communicate with automated data action tools 334, which may perform data processes to update the full database when the full database is started. ROVL management 1304 activates the data update process and also communicates with the larger database under management 332. In addition, ROVL management 1304 may issue start and stop commands to the larger database under management 332. In the embodiment the larger database under management 332 with all data is run only when needed.

Embodiments disclosed herein provide cost-effective management of cloud infrastructure elements and are designed to operate in an environment with both human and autonomous users.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" or central computer should be understood to refer to a service point which provides processing, database, and communication facilities. By way of example, and not limitation, the term "server" or central computer can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure, a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire□line type connections, wireless type connections, cellular or any combination thereof. Likewise, sub□networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand□alone ad□hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, 4G, or 5G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client device, such as, for example, a smart device, a tag, or an aggregator, may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web□enabled client device may include a high-resolution screen, one or more physical or virtual keyboards, mass storage, one or more accelerometers, one or more gyroscopes, global positioning system (GPS) or other location□identifying type capability, or a display with a high degree of functionality, such as a touch□sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo! ® Mail, short message service (SMS), or multimedia message service (MMS), for example Yahoo!

Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games. The foregoing is provided to illustrate that claimed subject matter is intended to include a wide range of possible features or capabilities.

Figure 14:
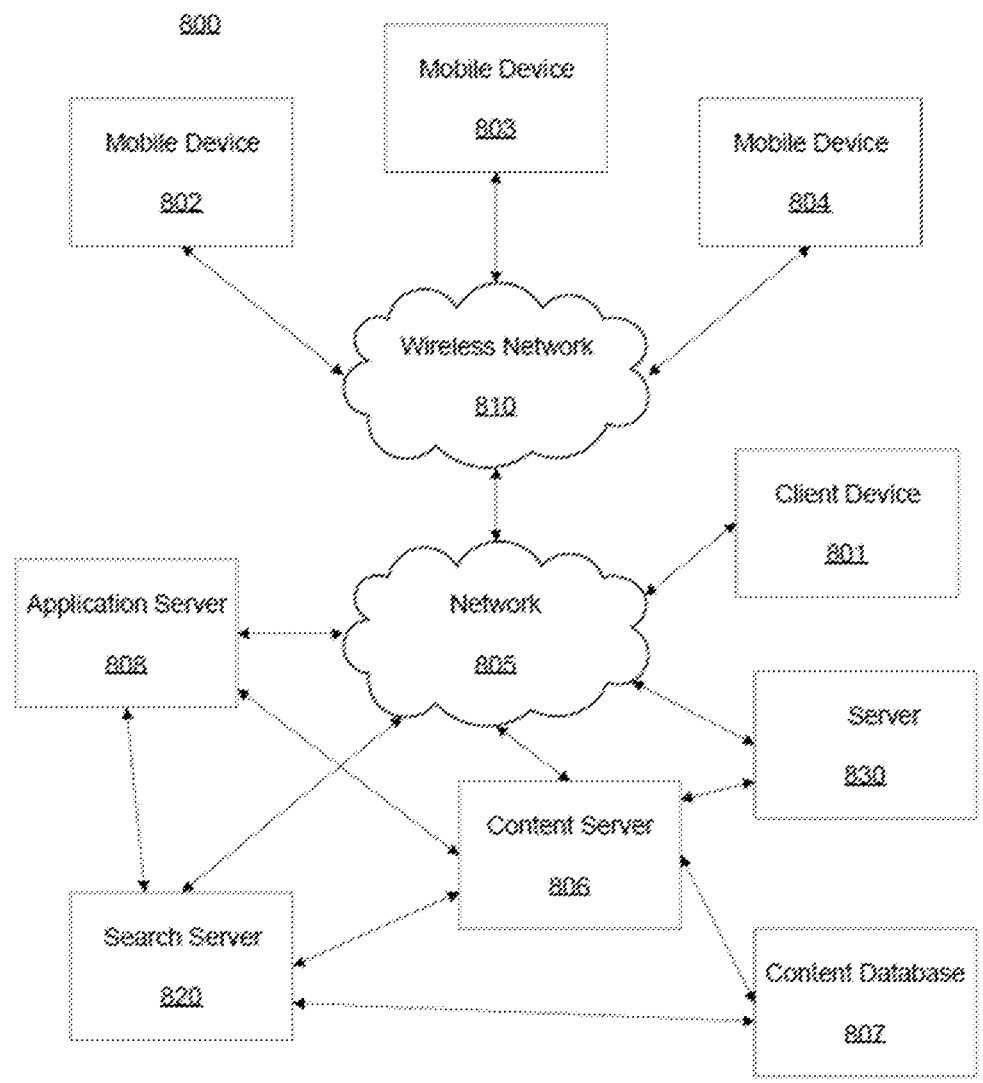
FIG. 14 is a block diagram illustrating mobile devices and a client device in communication with servers in accordance with various embodiments.

In general, with reference to FIG. 14, a system 800 in accordance with an embodiment of the present disclosure is shown. Not all the components may be required to practice the disclosure, and variations in the arrangement and type of the components may be made without departing from the spirit or scope of the disclosure. As shown, system 800 of FIG. 14 includes local area networks ("LANs")/wide area networks ("WANs")—network 805, wireless network 810, mobile devices (client devices) 802-804 and client device 801. One or more of mobile devices 802-804 and/or client device 801 may be a tag, a smart device, and/or an aggregator. FIG. 14 additionally includes a variety of servers (e.g., central computer), such as content server 806, application (or "App") server 808, search server 820 and server 830.

One embodiment of mobile devices 802-804 is described in more detail below. Generally, however, mobile devices 802-804 may include virtually any portable computing device capable of receiving and sending a message over a network, such as network 805, wireless network 810, or the like. Mobile devices 802-804 may also be described generally as client devices that are configured to be portable. Thus, mobile devices 802-804 may include virtually any portable computing device capable of connecting to another computing device and receiving information.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 802-804 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 802-804 may uniquely identify themselves through any of a variety of mechanisms, including a phone number, Mobile Identification Number (MIN), an electronic serial number (ESN), or other mobile device identifier.

In some embodiments, mobile devices 802-804 may also communicate with non-mobile client devices, such as client device 801, or the like. Client device 801 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 801 may also have differing capabilities for displaying navigable views of information.

Client devices 801-804 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 810 is configured to couple mobile devices 802-804 and its components with network 805. Wireless network 810 may include any of a variety of wireless sub-networks that may further overlay stand-alone ad-hoc networks, and the like, to provide an infrastructure-oriented connection for mobile devices 802-804. Such sub-networks may include mesh networks, Wireless LAN (WLAN) networks, cellular networks, and the like.

Network 805 is configured to couple content server 806, application server 808, or the like, with other computing devices, including, client device 801, and through wireless network 810 to mobile devices 802-804. Network 805 is enabled to employ any form of computer readable media for communicating information from one electronic device to another. Also, network 805 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 810 and/or 805 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 806 may include a device that includes a configuration to provide content via a network to another device. A content server 806 may, for example, host a site or service, such as streaming media site/service (e.g., Netflix®), an email platform or social networking site, or a personal user site (such as a blog, vlog, online dating site, and the like). A content server 806 may also host a variety of other sites, including, but not limited to business sites, educational sites, dictionary sites, encyclopedia sites, wikis, financial sites, government sites, and the like. Devices that may operate as content server 806 include personal computers desktop computers, multiprocessor systems, microprocessor-based or programmable consumer electronics, network PCs, servers, and the like.

Content server 806 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 808, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

Moreover, although FIG. 14 illustrates servers 806, 808, 820 and 830 as single computing devices, respectively, the disclosure is not so limited. For example, one or more functions of servers 806, 808, 820 and/or 830 may be distributed across one or more distinct computing devices. Moreover, in one embodiment, servers 806, 808, 820 and/or 830 may be integrated into a single computing device, without departing from the scope of the present disclosure.

Figure 15:
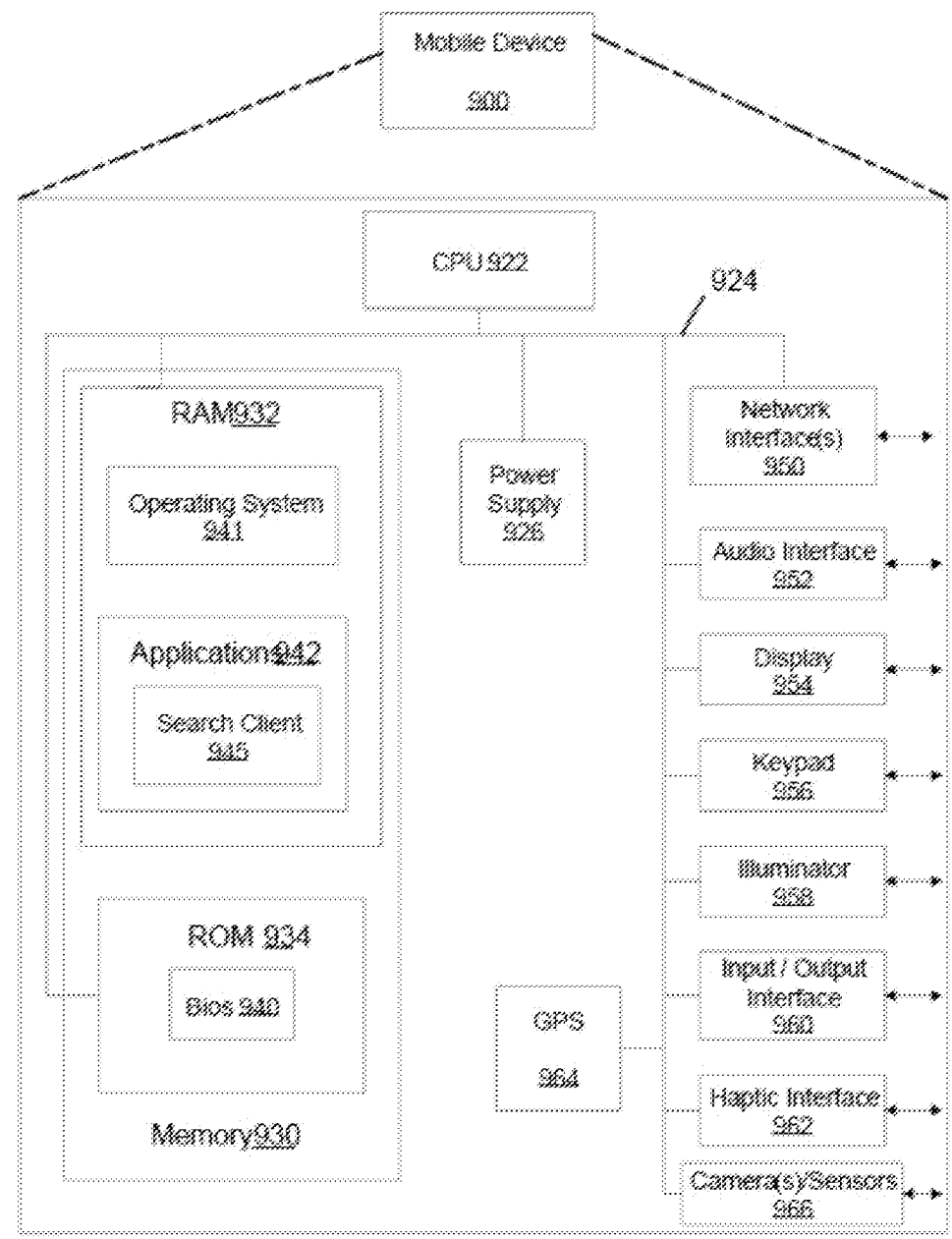
FIG. 15 is a block diagram illustrating components of a mobile device in accordance with various embodiments.

FIG. 15 is a schematic diagram illustrating a client device showing an example embodiment of a client device that may be used within the present disclosure. Client device 900 may include many more or less components than those shown in FIG. 15. However, the components shown are sufficient to disclose an illustrative embodiment for implementing the present disclosure. Client device 900 may represent, for example, client devices discussed above in relation to FIG. 15.

As shown in the figure, Client device 900 includes a processing unit (CPU) 922 in communication with a mass memory 930 via a bus 924. Client device 900 also includes a power supply 926, one or more network interfaces 950, an audio interface 952, a display 954, a keypad 956, an illuminator 958, an input/output interface 960, a haptic interface 962, an optional global positioning systems (GPS) receiver 964 and a camera(s) or other optical, thermal or electromagnetic sensors 966. Device 900 can include one camera/sensor 966, or a plurality of cameras/sensors 966, as understood by those of skill in the art. The positioning of the camera(s)/sensor(s) 966 on device 900 can change per device 900 model, per device 900 capabilities, and the like, or some combination thereof.

Power supply 926 provides power to Client device 900. A rechargeable or non-rechargeable battery may be used to provide power. The power may also be provided by an external power source, such as an AC adapter or a powered docking cradle that supplements and/or recharges a battery.

Client device 900 may optionally communicate with a base station (not shown), or directly with another computing device. Network interface 950 includes circuitry for coupling Client device 900 to one or more networks, and is constructed for use with one or more communication protocols and technologies as discussed above. Network interface 950 is sometimes known as a transceiver, transceiving device, or network interface card (NIC).

Audio interface 952 is arranged to produce and receive audio signals such as the sound of a human voice. For example, audio interface 952 may be coupled to a speaker and microphone (not shown) to enable telecommunication with others and/or generate an audio acknowledgement for some action. Display 954 may be a liquid crystal display (LCD), gas plasma, light emitting diode (LED), or any other type of display used with a computing device. Display 954 may also include a touch sensitive screen arranged to receive input from an object such as a stylus or a digit from a human hand.

Keypad 956 may comprise any input device arranged to receive input from a user. For example, keypad 956 may include a push button numeric dial, or a keyboard. Keypad 956 may also include command buttons that are associated with selecting and sending images. Illuminator 958 may provide a status indication and/or provide light. Illuminator 958 may remain active for specific periods of time or in response to events. For example, when illuminator 958 is active, it may backlight the buttons on keypad 956 and stay on while the client device is powered. Also, illuminator 958 may backlight these buttons in various patterns when particular actions are performed, such as dialing another client device. Illuminator 958 may also cause light sources positioned within a transparent or translucent case of the client device to illuminate in response to actions.

Client device 900 also comprises input/output interface 960 for communicating with external devices, such as a headset, or other input or output devices not shown in FIG.

15. Input/output interface 960 can utilize one or more communication technologies, such as USB, infrared, Bluetooth™, or the like. Haptic interface 962 is arranged to provide tactile feedback to a user of the client device. For example, the haptic interface may be employed to vibrate client device 900 in a particular way when the Client device 900 receives a communication from another user.

Optional GPS transceiver 964 can determine the physical coordinates of Client device 900 on the surface of the Earth, which typically outputs a location as latitude and longitude values. GPS transceiver 964 can also employ other geo-positioning mechanisms, including, but not limited to, triangulation, assisted GPS (AGPS), E-OTD, CI, SAI, ETA, BSS or the like, to further determine the physical location of Client device 900 on the surface of the Earth. It is understood that under different conditions, GPS transceiver 964 can determine a physical location within millimeters for Client device 900; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 930 includes a RAM 932, a ROM 934, and other storage means. Mass memory 930 illustrates another example of computer storage media for storage of information such as computer readable instructions, data structures, program modules or other data. Mass memory 930 stores a basic input/output system ("BIOS") 940 for controlling low-level operation of Client device 900. The mass memory also stores an operating system 941 for controlling the operation of Client device 900. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 930 further includes one or more data stores, which can be utilized by Client device 900 to store, among other things, applications 942 and/or other data. For example, data stores may be employed to store information that describes various capabilities of Client device 900. The information may then be provided to another device based on any of a variety of events, including being sent as part of a header during a communication, sent upon request, or the like. At least a portion of the capability information may also be stored on a disk drive or other storage medium (not shown) within Client device 900.

Applications 942 may include computer executable instructions which, when executed by Client device 900, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 942 may further include search client 945 that is configured to send, to receive, and/or to otherwise process a search query and/or search result using any known or to be known communication protocols. Although a single search client 945 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Figure 16:
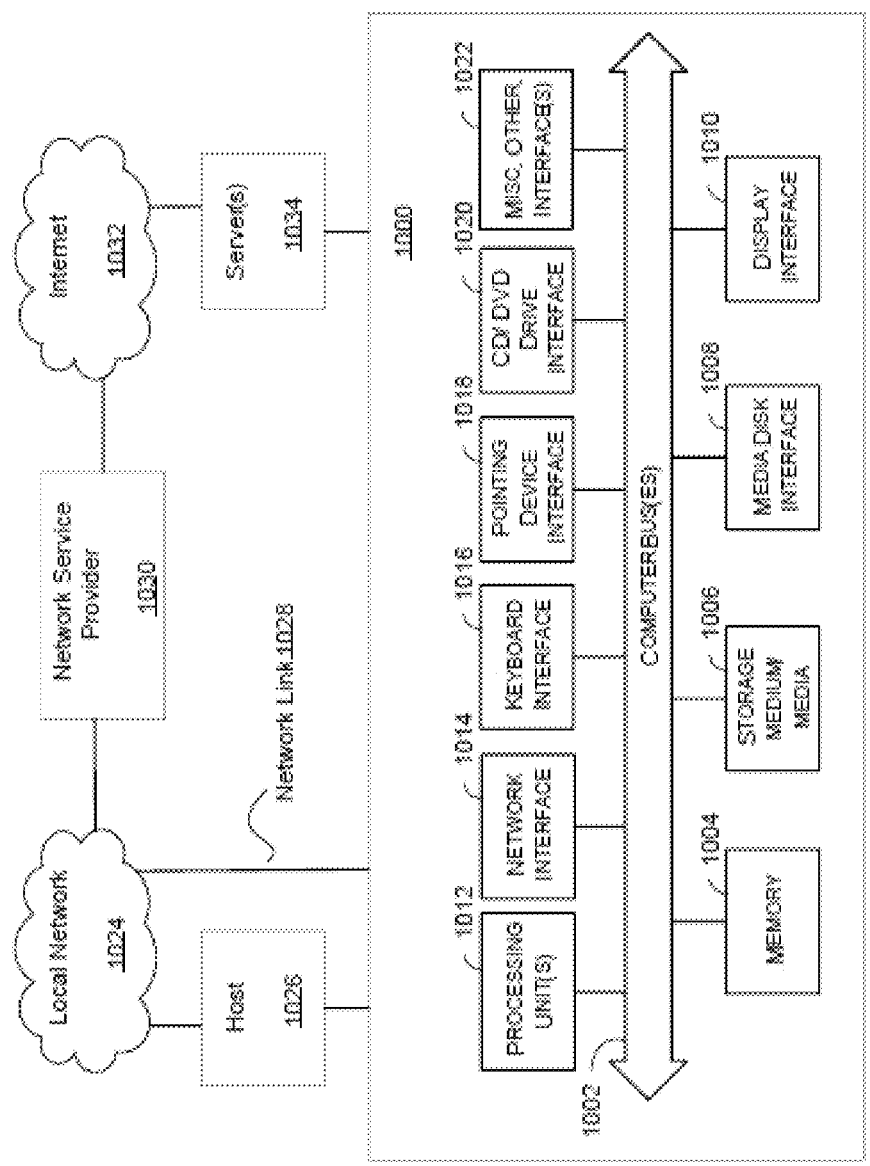
FIG. 16 is a block diagram of an internal architecture of a computing device in accordance with various embodiments.

As shown in FIG. 16, internal architecture 1000 of a computing device(s), computing system, computing platform and the like can include one or more processing units, processors, or processing cores, (also referred to herein as CPUs) 1012, which interface with at least one computer bus 1002. Also interfacing with computer bus 1002 are, for example, computer-readable medium, or media, 1006, network interface 1014, memory 1004, e.g., random access memory (RAM), run-time transient memory, read only memory (ROM), media disk drive interface 1020 as an interface for a drive that can read and/or write to media including removable media such as floppy, CD-ROM, DVD, media, display interface 1010 as interface for a monitor or other display device, keyboard interface 1016 as interface for a keyboard, pointing device interface 1018 as an interface for a mouse or other pointing device, and miscellaneous other interfaces not shown individually, such as parallel and serial port interfaces and a universal serial bus (USB) interface.

Memory 1004 interfaces with computer bus 1002 so as to provide information stored in memory 1004 to CPU 1012 during execution of software programs such as an operating system, application programs, device drivers, and software modules that comprise program code, and/or computer executable process steps, incorporating functionality described herein, e.g., one or more of process flows described herein. CPU 1012 first loads computer executable process steps from storage, e.g., memory 1004, computer readable storage medium/media 1006, removable media drive, and/or other storage device. CPU 1012 can then execute the stored process steps in order to execute the loaded computer-executable process steps. Stored data, e.g., data stored by a storage device, can be accessed by CPU 1012 during the execution of computer-executable process steps.

Persistent storage, e.g., medium/media 1006, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure.

Network link 1028 typically provides information communication using transmission media through one or more networks to other devices that use or process the information. For example, network link 1028 may provide a connection through local network 1024 to a host computer 1026 or to equipment operated by a Network or Internet Service Provider (ISP) 1030. ISP equipment in turn provides data communication services through the public, worldwide packet-switching communication network of networks now commonly referred to as the Internet 1032.

A computer called a server host 1034 connected to the Internet 1032 hosts a process that provides a service in response to information received over the Internet 1032. For example, server host 1034 hosts a process that provides information representing video data for presentation at display 1010. It is contemplated that the components of system 1000 can be deployed in various configurations within other computer systems, e.g., host and server.

At least some embodiments of the present disclosure are related to the use of computer system 1000 for implementing some or all of the techniques described herein. According to one embodiment, those techniques are performed by computer system 1000 in response to processing unit 1012 executing one or more sequences of one or more processor instructions contained in memory 1004. Such instructions, also called computer instructions, software and program code, may be read into memory 1004 from another computer-readable medium 1006 such as storage device or network link. Execution of the sequences of instructions contained in memory 1004 causes processing unit 1012 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 1000. Computer system 1000 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 1002 as it is received, or may be stored in memory 1004 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

In an embodiment, a method comprises creating, by a plurality of radio emitting devices each comprising a processor and transceiver, a geo-fence within a space, each radio emitting device capable of communicating with neighboring radio emitting devices in the plurality and capable of communicating with aggregators in communication with a central server computer over a network; and determining, by a subset of the plurality of radio emitting devices, a location of a user computing device executing a user application for the space when the user computing device is moved past the geo-fence and into the space, the determined location relative to the subset of the radio emitting devices, each radio emitting device in the subset transitioning from a sleep state to an active state when the user computing device moves within a predetermined distance from the subset of the radio emitting devices.

In an embodiment, a radio emitting device comprises a processor; a transceiver for communicating with other radio emitting devices and for communicating with an aggregator in communication with a central server computer over a network; and a storage medium for tangibly storing thereon program logic for execution by the processor, the program logic comprising radio emitting device communicating logic executed by the processor for communicating with a plurality of radio emitting devices to create a geo-fence within a space and for facilitating determination of a location of a user computing device by the radio emitting device and a subset of the plurality of radio emitting devices, the user computing device executing a user application for the space, the facilitating determination of the location occurring when the user computing device is moved past the geo-fence and into the space, the determined location relative to the radio emitting device, the radio emitting device transitioning from a sleep state to an active state when the user computing device moves within a predetermined distance from the subset of the radio emitting devices.

In an embodiment, a non-transitory computer readable storage medium tangibly storing thereon computer instructions for execution by a processor of a radio emitting device, the computer instructions comprising communicating with a plurality of radio emitting devices to create a geo-fence within a space and for facilitating determination of a location of a user computing device by the radio emitting device and a subset of the plurality of radio emitting devices, the user computing device executing a user application for the space, the facilitating determination of the location occurring when the user computing device is moved past the geo-fence and into the space, the determined location relative to the radio emitting device, the radio emitting device transitioning from a sleep state to an active state when the user computing device moves within a predetermined distance from the subset of the radio emitting devices.

Those skilled in the art will recognize that the methods, apparatuses and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure. All patents, patent applications, and published references cited herein are hereby incorporated by reference in their entirety. It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. It will be appreciated that several of the above-disclosed and other features and functions, or alternatives thereof, may be desirably combined into many other different systems or applications. All such modifications and variations are intended to be included herein within the scope of this disclosure, as fall within the scope of the appended claims.

The described embodiments are to be considered in all respects only as illustrative and not restrictive and the scope of the presently disclosed embodiments is, therefore, indicated by the appended claims rather than by the foregoing description. All changes which come within the meaning and range of equivalency of the claims are to be embraced within their scope. Skilled artisans may implement the described functionality in varying ways for each particular application, but such implementation decisions should not be interpreted as causing a departure from the scope of the disclosed apparatus and/or methods.

What is claimed is:

1. A method for controlling access to a cloud infrastructure, comprising:
    determining, by a processor, a need to access cloud services within the cloud infrastructure, the access to the cloud services including access to a first database;
    determining, by the processor, a time of the need to access the cloud services within the cloud infrastructure;
    storing, in at least one voter and user information database in communication with the cloud infrastructure, predetermined access rules for the cloud infrastructure;
    performing a voting process, the voting process including tallying votes from the at least one voter and user information database to determine whether to start or stop the first database;
    determining, based on querying the at least one voter and user information database, whether the time of the need to access the cloud services complies with the stored predetermined access rules; and
    in response to determining that the time of the need to access the cloud services complies with the stored predetermined access rules, allowing access to the cloud services within the cloud infrastructure,
    wherein the determining the need to access the cloud services within the cloud infrastructure and the performing a voting process both include actions performed by an autonomous computing device,
    wherein the autonomous computing device polls availability of the cloud infrastructure based on the time of the need, and
    wherein the polling triggers actions to be performed.

2. The method of claim 1, wherein the predetermined access rules allow access to the cloud services within the cloud infrastructure if the time of the need to access the cloud services is in a top of an hour of time.

3. The method of claim 2, wherein the predetermined access rules do not allow access to the cloud services within the cloud infrastructure if the time of the need to access the cloud services is in a bottom of an hour of time.

4. The method of claim 1, further comprising determining a load on the first database.

5. The method of claim 4, further comprising starting additional copies of the first database based on a predetermined load threshold.

6. The method of claim 1, wherein the at least one voter and user information database comprises a voting database and a client database, and the voting process further includes:
    gathering votes from the voting database, wherein votes may be changed after initial voting preferences are submitted;
    querying the client database for voting information;
    determining whether the first database is running or not running; and
    issuing a command to access the first database if the vote tally indicates starting the first database, or shut down the first database if the vote tally indicates stopping the first database.

7. An apparatus for controlling access to a cloud infrastructure, comprising:
    at least one voter and user information database in communication with the cloud infrastructure, wherein the at least one voter and user information database comprises predetermined access rules for the cloud infrastructure, and wherein the at least one voter and user information database further comprises a voting database;
    a processor; and
    memory containing instructions configured to instruct the processor to perform a voting process, the voting process including tallying votes from the voting database to determine whether to start or stop a first database sought to be accessed.

8. The apparatus of claim 7, wherein the instructions are further configured to instruct the processor to:
    determine a need to access cloud services within the cloud infrastructure;
    determine a time of the need to access the cloud services; and
    allow access to the cloud services if the time of the need to access the cloud services complies with the predetermined access rules.

9. The apparatus of claim 8, wherein allowing access to the cloud services includes determining if the need to access the cloud services is in a top or bottom of an hour of time.

10. The apparatus of claim 8, wherein the at least one voter and user information database further comprises a client database, and wherein the voting process further includes:
    gathering votes from the voting database;
    querying the client database for voting information;
    determining whether the first database is active or off; and
    issuing a command based on the vote tally, wherein the command is to access the first database if the vote tally indicates starting the first database, or shut down the first database if the vote tally indicates stopping the first database.

11. A non-transitory computer-readable medium, containing instructions, which when executed cause a processor to perform the following steps:
    determine a need to access cloud services within a cloud infrastructure, the access to the cloud services including access to a first database;

determine a time of the need to access the cloud services within the cloud infrastructure;

store, in at least one voter and user information database in communication with the cloud infrastructure, predetermined access rules for the cloud infrastructure;

perform a voting process, the voting process including tallying votes from the at least one voter and user information database to determine whether to start or stop the first database; and allow access to the cloud services within the cloud infrastructure if the time of the need to access the cloud services complies with the predetermined access rules, wherein the determining the need to access the cloud services within the cloud infrastructure and the performing a voting process both include actions performed by an autonomous computing device, wherein the autonomous computing device polls availability of the cloud infrastructure based on the time of the need, and wherein the polling triggers actions to be performed.

12. The non-transitory computer-readable medium of claim 11, further comprising instructions for allowing access to the cloud services within the cloud infrastructure if the time of the need to access the cloud services is in a top of an hour of time.

13. The non-transitory computer-readable medium of claim 11, further comprising instructions for not allowing access to the cloud services within the cloud infrastructure if the time of the need to access the cloud services is in a bottom of an hour of time.

14. The non-transitory computer-readable medium of claim 11, further comprising instructions for polling availability of the cloud infrastructure based on the time of the need.

15. The non-transitory computer-readable medium of claim 11, further comprising instructions for determining a load on the first database.

16. The non-transitory computer-readable medium of claim 11, further comprising instructions for starting additional copies of the first database within the cloud infrastructure based on a predetermined load threshold.

17. The non-transitory computer-readable medium of claim 11, further comprising instructions for:

determining whether the first database is on or off; and issuing a command based on the vote tally, wherein the command is to access the first database if the vote tally indicates starting the first database, or shut down the first database if the vote tally indicates shutting down the first database.

* * * * *